US008669966B2

(12) United States Patent
Payne

(10) Patent No.: US 8,669,966 B2
(45) Date of Patent: Mar. 11, 2014

(54) TOUCHSCREEN DISPLAYS INCORPORATING DYNAMIC TRANSMITTERS

(76) Inventor: Jonathan Payne, San Jose, CA (US)

(*) Notice: Subject to any disclaimer, the term of this patent is extended or adjusted under 35 U.S.C. 154(b) by 83 days.

(21) Appl. No.: 13/406,400

(22) Filed: Feb. 27, 2012

(65) Prior Publication Data
US 2012/0218228 A1 Aug. 30, 2012

Related U.S. Application Data

(60) Provisional application No. 61/446,919, filed on Feb. 25, 2011.

(51) Int. Cl.
G06F 3/042 (2006.01)
(52) U.S. Cl.
USPC .......................................... 345/175
(58) Field of Classification Search
USPC ................................. 345/173–178
See application file for complete search history.

(56) References Cited

U.S. PATENT DOCUMENTS 4,811,004 A 3/1989 Person et al.
6,664,952 B2 12/2003 Iwamoto et al.
2008/0278460 A1* 11/2008 Arnett et al. .................. 345/175
2009/0278794 A1* 11/2009 McReynolds et al. ........ 345/156
2010/0201637 A1* 8/2010 Herne et al. .................. 345/173
2010/0328243 A1* 12/2010 Wang et al. ................... 345/173
2011/0025620 A1* 2/2011 Jakobsen et al. ............. 345/173

FOREIGN PATENT DOCUMENTS

| JP | 2001264011 | 9/2001 |
| JP | 2008036297 | 2/2008 |
| JP | 2008217273 | 9/2008 |
| TW | I304544 | 12/2008 |
| TW | M358363 | 6/2009 |

* cited by examiner

Primary Examiner — Dennis Joseph
(74) Attorney, Agent, or Firm — KPPB LLP

(57) ABSTRACT

Systems and methods for implementing touchscreen displays that utilize a transmitter system to dynamically scan at least one light beam across a surface of interest such that substantially every point in a region above the surface of interest is dynamically scanned by a light beam from two directions, a receiver system to receive and detect the at least one dynamically scanned light beams, and a processor configured to determine locations of contact are provided. The systems and methods may utilize a transmitter system that includes dynamic transmitters, which may be in the form MEMS micromirrors used in conjunction with infrared semiconductor lasers.

20 Claims, 19 Drawing Sheets

TOUCHSCREEN DISPLAYS INCORPORATING DYNAMIC TRANSMITTERS

CROSS-REFERENCE TO RELATED APPLICATION

The present application claims the benefit under 35 U.S.C. 119(e) of the filing date of U.S. Provisional Application Ser. No. 61/446,919 filed Feb. 25, 2011, the disclosure of which is incorporated by reference herein in its entirety.

FIELD OF THE INVENTION

The present invention generally relates to touchscreen displays and more specifically to touch screen displays utilizing infrared optical technologies.

BACKGROUND

Touchscreen displays are "electronic visual display[s] that can detect the presence and location of a touch within the display area." (http://en.wikipedia.org/wiki/Touchscreen). They have become increasingly prominent in modern electronics as they provide for a highly effective and intuitive means of interacting with a device.

Current touchscreen displays utilize any one of several technologies to perceive contact—those technologies can be broadly classified as infrared optical technologies and non-infrared-optical technologies. Touchscreen displays that rely on infrared optical technologies typically operate by projecting a plurality of distinct light beams so as to form a Cartesian-type grid above the surface of a display. Each light beam is typically received at the other end of the display surface by a corresponding 'receiver.' When the screen is touched or otherwise contacted, the lines of site between specific light beams and their respective receivers may become obstructed. Thus, a location of contact may be determined based on which specific lines of sight are obstructed.

Typically, in accordance with this type of system, light-emitting diodes ("LEDs") are used to project the light beams. LEDs are essentially semiconducting light sources. (http://en.wikipedia.org/wiki/Light-emitting_diode). Similarly, these light beams are typically received by photodiodes. Photodiodes are photodetectors that are capable of converting light into an electrical signal. (See e.g., http://en.wikipedia.org/wiki/Photodiode).

FIG. 1 illustrates a typical optics-based touchscreen display. Light beams are projected across the surface of the touchscreen display 101 via LEDs 102, and they are projected through perpendicular trajectories 104 and 106. Each of the light beams projected is received at the other end of the touchscreen display by a particular photodiode 108. The photodiodes 108 signal the reception of the incident light beams to an associated microprocessor 110. A member that contacts the surface of the display will intercept certain of the projected light beams. Thus, the microprocessor 110 can compute the location of contacting member by evaluating which of the photodiodes is not signaling the reception of incident light beams because of the obstructing contacting member.

SUMMARY OF THE INVENTION

Systems and methods in accordance with embodiments of the invention implement touchscreen displays, touch-pads, or touch-surfaces, which utilize a transmitter system that generates at least one light beam that dynamically scans above a surface of interest such that substantially all points in a region above the surface of interest are scanned from at least two different directions, a receiver system that receives the scanned light beams and detects breaks in the light beams, and a processor for processing related signaling. One embodiment includes a touchscreen display that includes a surface of interest, a transmitter system that generates at least one light beam that dynamically scans above a surface of interest such that substantially all points in a region above the surface of interest are scanned from at least two different directions, a receiver system that is configured to receive and detect the light beams as they scan across the surface of interest, and a processor for computing the location of a member that is contacting the surface of interest.

In another embodiment, the transmitter system includes a single dynamic transmitter.

In yet another embodiment, the transmitter system includes a single dynamic transmitter that is in the form of a MEMS micromirror used in conjunction with at least two sources of light.

In still another embodiment, at least one of the at least two sources of light is an infrared semiconductor laser.

In another embodiment, the transmitter system is configured to signal the angular position of the single dynamic transmitter to the processor.

In yet another embodiment, the transmitter system includes at least two dynamic transmitters.

In a further embodiment, at least one of the two dynamic transmitters is in the form of a MEMS micromirror in conjunction with at least one source of light.

In yet another embodiment, at least one of the sources of light is an infrared semiconductor laser.

In another embodiment, the transmitter system includes at least two dynamic transmitters, and the transmitter system is configured to signal the angular position of at least one of the dynamic transmitters to the microprocessor.

In still another embodiment, the transmitter system includes a MEMS micromirror that is configured to reflect at least one of the scanned beams across the surface of interest.

In another embodiment, the MEMS micromirror is configured to rotate through an angle in an oscillatory fashion.

In yet another embodiment, the transmitter system scans at least one light beam in a direction out of the plane of the surface of interest.

In a further embodiment, the light beams are scanned through a transmissive body.

In still a further embodiment, at least one light beam is scanned so as to approximate the emission of a Cartesian-type grid of light beams.

In yet still another embodiment, the approximation of the emission of a Cartesian-type grid of light beams is achieved using a single MEMS micromiror, a single light source, and a system of folding mirrors and optical strips.

In still another embodiment, the receiver system comprises at least one element that is capable of receiving light and at least one element that is capable of detecting light.

In another embodiment, at least one element capable of receiving light is a light distributing sensor, at least one element capable of detecting light is a photodiode, and at least one light distributing sensor is configured to redirect incident light to at least one photodiode.

In another embodiment, at least one element capable of receiving light is a waveguide receive lens.

In still another embodiment, at least one waveguide receive lens is configured to transmit light to a CMOS Linear Array of Pixel Cells.

In yet another embodiment, at least one waveguide receive lens is configured to transmit light to the CMOS Linear Array of Pixel Cells via at least one waveguide.

In another embodiment, the receiver system is configured to signal the reception and detection of incident light to the processor.

In still another embodiment, the processor is configured to compute the location of a contacting member by evaluating the signal provided to it by the receiver system.

In again another embodiment, the receiver system includes a plurality of elements that are capable of receiving light, at least one element that is capable of receiving light, at least one element that is capable of detecting light, and where the processor computes the location of the contacting member by evaluating which of the elements capable of receiving light are receiving light.

In yet another embodiment, the transmitter system includes at least one dynamic transmitter, where the transmitter system is configured to signal the angular position of the at least one dynamic transmitter to the processor, where the receiver system is configured to signal the detection of light to the processor, and where the processor is configured to compute the location of the contacting member using the signal provided by the transmitter system and the signal provided by the receiver system.

Yet another embodiment is a method of triangulating a contact point incident on a surface of interest including dynamically scanning at least one light beam above a surface of interest such that substantially every point in a region above the surface of interest is dynamically scanned by a light beam from at least two directions using a transmitter system that includes at least one dynamic transmitter, detecting the scanned light beams using a receiver system, generating a signal in response to the detection of the light beams using the receiver system, providing the signal to a processor, and computing the location of the contact point using the processor.

In yet another embodiment of the invention, the receiver system includes at least one receiving element capable of receiving the scanned light beams, and where the light beams are scanned such that none of the light beams are ever simultaneously incident on any single receiving element.

In still another embodiment, at least one dynamic transmitter is intermittently powered off such that none of the light beams are ever simultaneously incident on any single receiving element.

In another embodiment, the processor computes the contact point using geometric principles.

In yet another embodiment, the transmitter system signals the angular position of the at least one dynamic transmitter to the processor, and the processor evaluates the angular position of the at least one dynamic transmitter in triangulating the contact point.

In still yet another embodiment, the receiver system comprises a plurality of receiving elements, and the processor evaluates which of the receiving elements were obstructed from receiving the light beams in triangulating the contact point.

DETAILED DESCRIPTION

Figure 1:
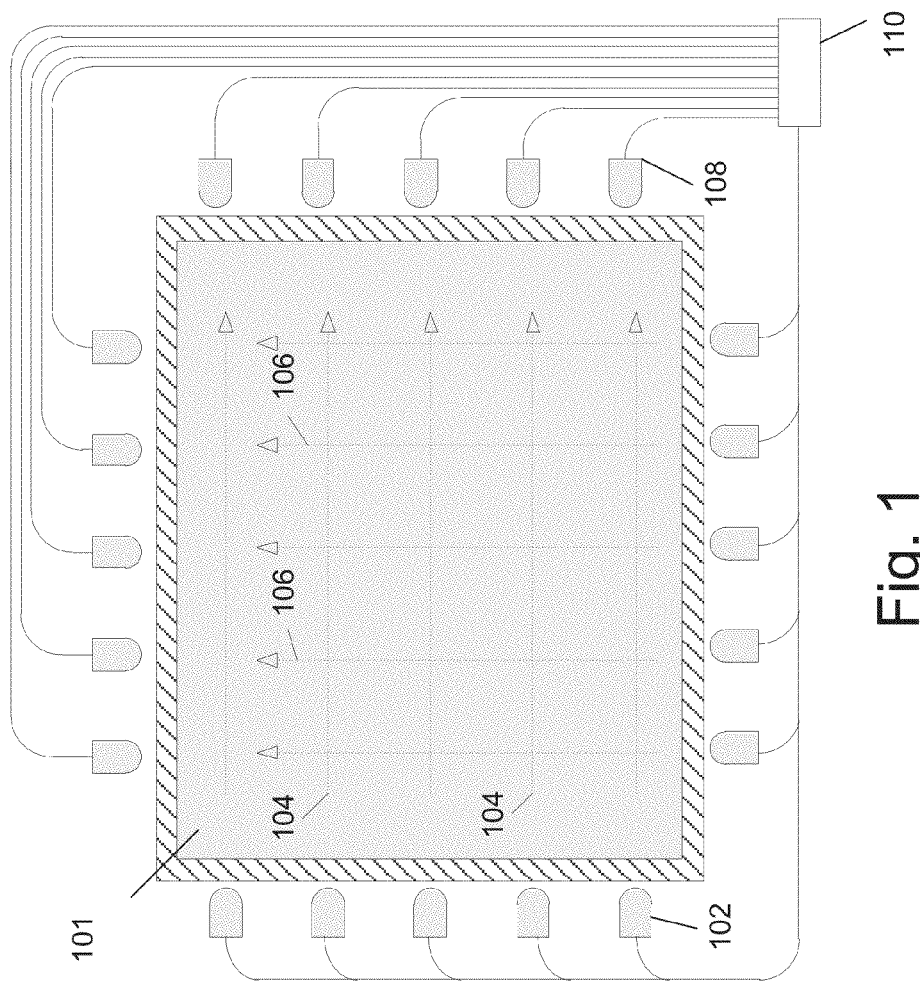
FIG. 1 illustrates a typical touchscreen display.

Turning now to the drawings, systems and methods for implementing touchscreen displays, touch-pads, or touch-surfaces, utilizing a transmitter system that generates at least one light beam that dynamically scans above a surface of interest such that substantially all points in a region above the surface of interest are scanned from at least two different directions, a receiver system that receives the scanned light beams and detects breaks in the light beams, and a processor for processing related signaling in accordance with embodiments of the invention are illustrated. The transmitter system can utilize a dynamic transmitter or can utilize multiple dynamic transmitters. The light beams' scanning pattern may be configured so that a contacting member (a tangible object that is within sufficient proximity of the surface of interest) will inhibit light beam reception and thereby allow the location of the contact point (the spatial region at which a contacting member is within sufficient proximity of the surface of interest) to be triangulated. Depending on the specific configuration of the touchscreen display, the receiver system and/or the transmitter system can be used to determine contact locations.

A dynamic transmitter is a system that can emit at least one light beam, and is capable of maneuvering that emitted light beam. A dynamic transmitter may be a microelectromechanical system ("MEMS") micromirror in conjunction with a light source capable of generating a beam in accordance with embodiments of the invention. MEMS micromirrors are essentially tiny mirrors that are on the scale of thousandths of a millimeter and can be as large as several millimeters. They are widely available and can be fabricated within a gimbal to allow pivoting along either one or two axes, whereby an applied voltage controls the motion of the mirror across those axes. The light beam may originate from a light-emitting diode ("LED"), an infrared semiconductor laser, or other light source. Thus, a dynamic transmitter may be implemented by shining a light beam onto the MEMS micromirror—a voltage can then be applied to the mirror's actuator so as to cause the light beam reflected from the micromirror to scan in a desired pattern above a surface of interest in accordance with embodiments of the invention.

Alternatively, in other embodiments, dynamic transmitters may be based on other types of electro-optical, opto-mechanical, eletromechanical, or magnetic systems. In yet other embodiments, the dynamic transmitters are based on reflective, refractive, diffractive, phase, interferometric reflective, or transmissive optical principles.

In accordance with embodiments of the invention, a receiver system may include elements that receive incident light emitted from the transmitter system, and may include elements that detect any obstructions blocking the light beams emitted from the transmitter system. The elements used to receive incident light emitted from the transmitter system may be 'polymer waveguide receive lenses,' light distributing sensors, or they may be any other suitable element.

Polymer waveguide receive lenses are supporting optical structures that are configured to receive incident light, and may be used in conjunction with waveguides—structural devices that allow light to be guided such as optical fibers (see e.g., http://www.rp-photonics.com/waveguides.html). Together, polymer waveguide receive lenses and waveguides may be used to receive incident light and redirect it in a particular direction or to a particular destination.

The elements used to detect any obstructions blocking the light beams emitted from the transmitter system may be photodiodes, they may be a CMOS linear array of pixel cells, or they may be any other light detecting system.

In other embodiments, the receiver system may include elements that both receive and detect incident light beams. These elements may be photodiodes, or they may be any other suitable element.

In several embodiments, a processor is used for processing signaling and/or for computing relevant calculations. The processor may be a microcontroller, microprocessor, application specific integrated circuit ("ASIC"), field programmable gate array ("FPGA"), or any other electronic device capable of implementing the necessary calculations in accordance with embodiments of the invention In a number of embodiments, a touchscreen display utilizes a receiver system that includes photodiodes that can detect the presence of light incident along an edge of the boundary of a surface of interest. This may be achieved by placing light distributing sensors along the edges of a surface of interest that are configured to redirect incident light toward corresponding photodiodes. For example, as a light beam scans above the surface of interest, a contacting member may intercept that light beam at some point and momentarily prohibit it from reaching the light distributing sensors. The corresponding photodiode may then detect this irregular absence of incident light, and signal this disruption to an associated processor, which can then conclude that the touchscreen display has been contacted. Accordingly, the angular position of the light beam's respective dynamic transmitter at the point of contact may be retrieved, since it may be a function of the known applied voltage. The scanning of light beams may be configured so that substantially every point in a region above the surface of interest will be dynamically scanned from at least two different directions. Thus, in accordance with the above-described principles, the angular position of the dynamic transmitter(s) at the time the contact point is intersected from two different directions can be obtained. The processor may then compute the location of contact given the angular positions of the dynamic transmitters. In many embodiments, the angular rotation of the dynamic transmitter(s) and the reception of the scanned beam are synchronized relative to a clock signal and the processor can determine the location of the beam based upon the time at which the interruption of the beam is detected.

A touchscreen display may include an array of receiving elements that are arranged to border at least a portion of the surface of interest in accordance with many embodiments of the invention. The receiving elements can include (but are not limited to) polymer waveguide receive lenses. The receiving elements may be configured to receive light beams emitted from a transmitter system, and transmit the incident light to a light detecting system, such as a CMOS Linear Array of Pixel Cells, which may then send associated signals to a processor, and the processor can then interpret those signals. Alternatively, the receiving elements may be discrete photodiodes, other light detectors, or a photovoltaic strip, all of which can directly signal the reception of incident light to an associated processor.

The receiving elements may be arranged so that, as long as the touchscreen display's transmitter system is emitting at least one light beam such that substantially every point above in a region above the surface of interest is dynamically scanned from at least two different directions, the contact point may be determined based on which of the array of light beam receivers is inhibited from receiving emitted light beams.

In many embodiments of the invention, a touchscreen display's light beams are propagated through free space; in several embodiments of the invention, a touchscreen display's light beams are propagated through a transmissive body. If the light beams are propagated through free space, then the touchscreen display will rely on light beam obstruction to determine the contact point. If the light beams are propagated through a transmissive body, then the touchscreen display will rely on frustrated total internal reflection in order to determine the contact point. Specifically, a contacting member exerts a normal force on the transmissive body. In turn, this applied force will distort the transmissive body's optics so as to prohibit the light beam from reaching the light beam receiver. As before, the processor may then detect the absence of light beam reception, and thereby determine the angular position of the dynamic transmitter at the contact point. Also as before, the dynamic scanning of a light beam such that substantially every point in a region above the surface of interest is dynamically scanned from two different directions, a contacting member will inhibit the dynamic scanning in both directions such that the specific location of the contact point can be triangulated.

Touchscreen displays, and dynamic transmitters and sensors that can be utilized to implement touchscreen displays in accordance with embodiments of the invention are discussed further below.

Touchscreen Displays

In many embodiments, a touchscreen display includes a transmitter system that scans at least two light beams across a surface of interest is utilized in conjunction with a receiver system that detects when each of the two light beams is obstructed, in order to determine the location of contact. In determining the location of contact, some of these embodiments first determine the point in time when the surface has been contacted, then retrieve the angular position of the transmitter system's dynamic transmitters at that point in time, and finally use the angular position to triangulate the contact point.

Figure 2:
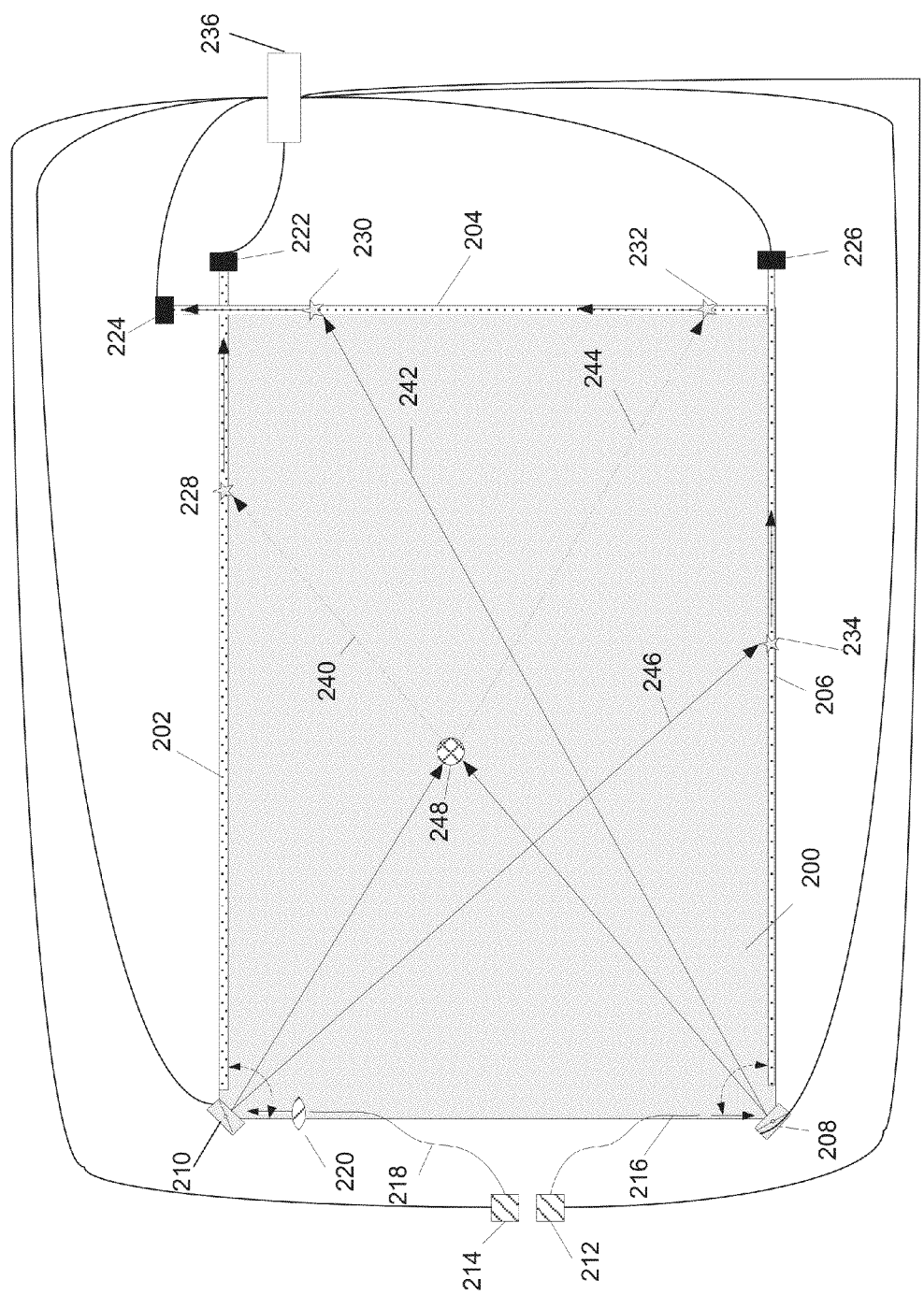
FIG. 2 illustrates a touchscreen display that utilizes two dynamic transmitters to transmit light beams that are received by a receiver system that includes light distributing sensors and photodiodes, in accordance with an embodiment of the invention.

A touchscreen display employing a pair of dynamic transmitters that each scan a light beam of light across a surface of interest from a different direction in accordance with an embodiment of the invention is illustrated in FIG. 2. The surface of interest 200 is rectangular in shape and bounded along three edges by distributing light sensors 202, 204, and 206. One edge of the surface of interest is not bounded by a distributing light sensor; a dynamic transmitter in the form of a MEMS micromirror, 208 and 210, in conjunction with respective infrared semiconductor lasers, 212 and 214, is located at each end point of this unbounded edge. The infrared semiconductor lasers 212 and 214 are configured to deliver light to their respective MEMS micromirrors through optical fibers 216 and 218 respectively. In several embodiments, a refracting lens 220 may be included to alter the light beam from a respective optical fiber, 216 and 218, prior to the light beam reaching its respective MEMS micromirrors, 208 and 210. The reflective surface of each MEMS micromirror, 208 and 210, faces in towards the surface of interest 200. The MEMS micromirrors 208 and 210 are configured to be able to swivel about an axis perpendicular to the face of the surface of interest 200. They swivel through an angle that is approximately confined within the right angle formed by the edges of the surface of interest that are adjacent to each respective MEMS micromirror 208 and 210. Each of the distributing light sensors 202, 204, 206 has an associated photodiode 222, 224, 226 respectively. The distributing light sensors 202, 204, 206 are configured to distribute incident light 228, 230, 232, and 234 to their respective associated photodiodes 222, 224, 226. The photodiodes 222, 224, and 226 and the MEMS micromirrors 208 and 210 are connected to an associated processor 236.

In this illustrated embodiment, the touch screen is configured to function as follows. Light beams from the infrared semiconductor lasers 212 and 214 are guided by the optical fibers 216 and 218 to the MEMS micromirrors 208 and 210. Each of the MEMS micromirrors 208 and 210 reflects the light beam from its respective laser above and across the surface of interest 200 such that the reflected light beam is targeted at one of the light distributing sensors 202, 204, and 206 that bound the surface of interest 200. Each of the MEMS micromirrors, 208 and 210, is actuated so that it continually swivels back and forth through an angle. As the MEMS micromirrors swivel, the light beam reflected off of the MEMS micromirrors also rotates through that angle, thereby dynamically scanning the surface. Thus, each MEMS micromirror generates a 'radial light field': rays 240 and 242 are exemplary trajectories within the radial light field generated by MEMS micromirror 208; and rays 244 and 246 are exemplary trajectories within the radial light field generated by MEMS micromirror 210. The coverage of these radial light fields is configured to encompass the substantial majority of the surface of interest 200. When the surface of interest is contacted, for example at contact point 248, the contacting member will at some point, intercept the light beams as they traverse the trajectories defined by rays 240 and 244 projected by the MEMS micromirrors 208 and 210. The light beams reflected from the MEMS micromirrors are scanning at a high enough frequency such that the point at which the light beams are intercepted is approximately simultaneous, if not precisely simultaneous. Because the light beams are (approximately) simultaneously intercepted, the intended target of those light beams at the point of interception, distributing light sensors 202 and 204, will not receive incident light, and their corresponding photodiodes 222 and 224 will signal this disturbance to a microprocessor 236, which determines that the surface of interest 200 has been contacted. The microprocessor can then retrieve the angular positions of the MEMS micromirrors, 208 and 210, when the surface was contacted, since the angular positions are functions of the known applied voltage. With both angular positions known, the location of the contact point can be triangulated. This triangulation process is more thoroughly discussed below.

Figure 3A:
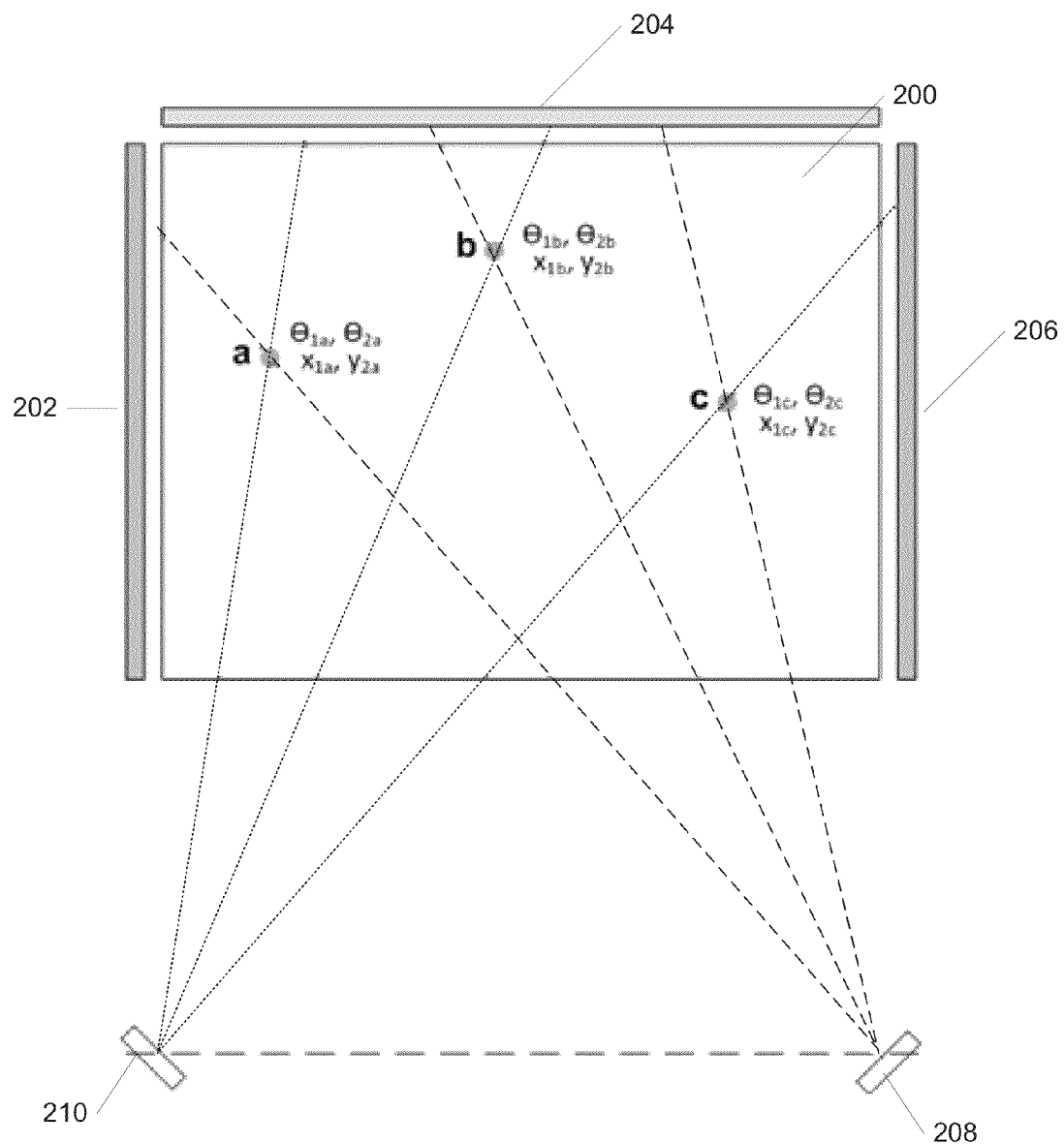
FIG. 3A illustrates geometries that may be established within a touchscreen display to facilitate a process of triangulating a location of contact in accordance with an embodiment of the invention.
Figure 3B:
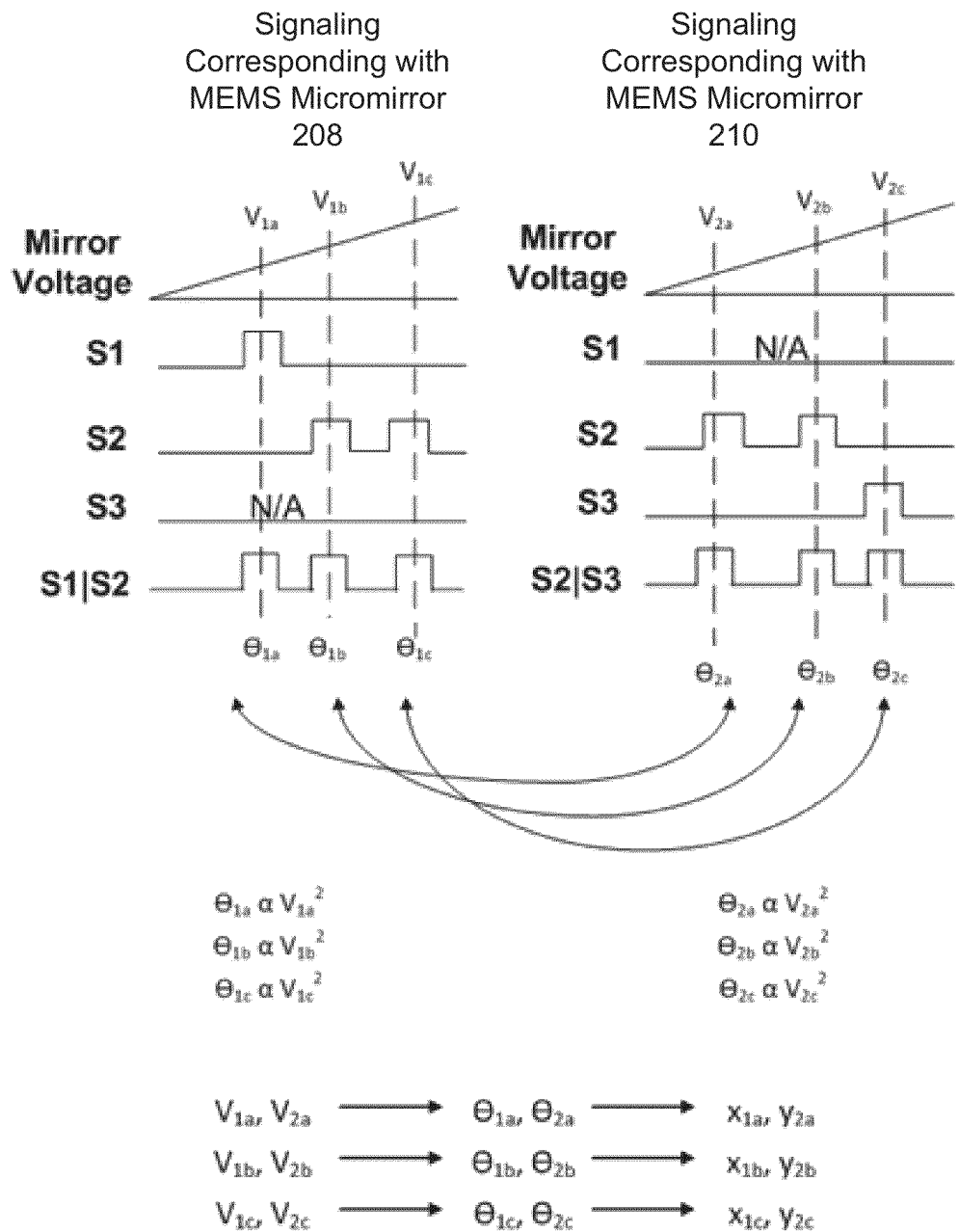
FIG. 3B illustrates relevant signaling in conjunction with triangulating a location of contact in accordance with an embodiment of the invention.

Triangulating a Contact Point Using the Angular Position of Dynamic Transmitters The location of a contact point may be triangulated using the known angular positions of a transmitter system's dynamic transmitter(s). A method of triangulation utilized by a touchscreen display with a particular configuration (a transmitter system comprising two MEMS micromirrors and a receiver system comprising light distributing sensors in conjunction with photodiodes as discussed above and illustrated previously in FIG. 2) in accordance with embodiments of the invention is illustrated in FIGS. 3A and 3B. Although FIGS. 3A and 3B demonstrate a method of triangulation in accordance with a particular configuration of a transmitter system and a receiver system, it should of course be understood that the principles underlying this disclosed method may be applied to other configurations and should not be misunderstood to only apply to the particular configuration that is illustrated.

FIG. 3A depicts the geometric relationship that may be established within the particular touchscreen display in accordance with embodiments of the invention, while related FIG. 3B depicts the signaling associated with the microprocessor during the operation of the particular touchscreen display and further illustrates how the location of a point of contact may be determined in accordance with embodiments of the invention. As shown in FIG. 3B, a voltage—that is a known function of time—is applied to each of the MEMS micromirrors 208 and 210. The applied voltage causes a respective mirror to swivel through an angle $\Theta$, which in turn causes the respective light beam reflected from that mirror to dynamically scan the surface of interest through angle $\Theta$. As shown in FIG. 3A, when the surface of interest is free of contact, the light beams are able to reach the light distributing sensors 202, 204, 206 unhindered, and the photodiodes (not shown) may signal the reception of light. However, when the surface of interest 200 is contacted, the contacting member will intercept the light beams at some point in time during their scan and thereby prohibit them from reaching the light distributing sensors 202, 204, 206 at this point in time; the corresponding photodiodes (not shown) signal this disturbance to an associated microprocessor (not shown), which then concludes that a contact has occurred. The microprocessor is configured to retrieve the angular position of both mirrors at the moment of contact, which it can do since the angular positions are known functions of the known applied voltage. As the angular position of both mirrors may be determined, the microprocessor can use geometric principles to determine the contact point.

For example, turning to FIG. 3A, when the surface of interest is contacted at point "a", the light beam reflected from MEMS micromirror 208 is precluded from reaching the light distributing sensor 202 at some point in time during its scan. Similarly, the light beam reflected from MEMS micromirror 210 is also prohibited from reaching light distributing sensors 204 at some point in time during its scan. The MEMS micromirrors are scanned sufficiently frequently that the points in time at which the light beams are intercepted is approximately simultaneous, if not precisely simultaneous. The corresponding photodiodes (not shown) detect this irregularity and send a corresponding signal to a microprocessor (not shown), which then concludes that the display has been contacted. The interpretation of this signaling is depicted in FIG. 3B. Thus, when the light beams are intercepted at point "a", S1, the signal associated with light distributing sensor 202, signals a disruption in the regular reception of incident light, as indicated in FIG. 3B; similarly S2, the signal associated with light distributing sensor 204, signals a disruption in the regular reception of incident light. The microprocessor then retrieves the angular position of each MEMS micromirror at the point in time in which the contact occurred, and is able to do so because the angular position of each mirror is a known function of the known voltage applied to each mirror, as shown in FIG. 3B. Thus, the microprocessor concludes that the MEMS micromirrors were at angular positions $\Theta_{1a}$ and $\Theta_{2a}$ respectively. Since the angular position of both mirrors is known, the microprocessor can then deduce the contact point using geometric principles.

Strategically Modulating the Dynamic Transmitters

Figure 4:
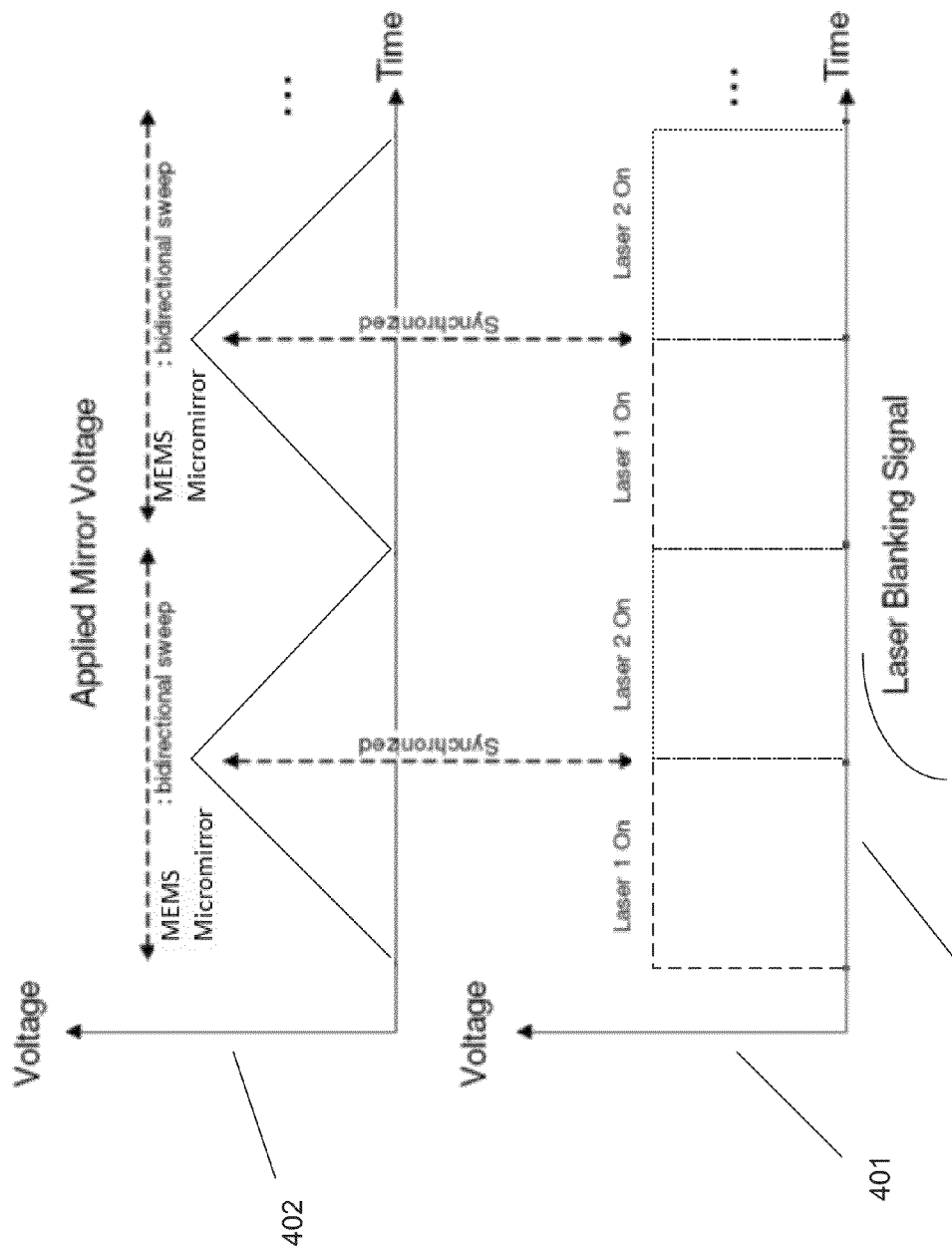
FIG. 4 illustrates how dynamic transmitters that are utilized in touchscreen displays may be strategically modulated in accordance with an embodiment of the invention.

In several embodiments of the invention, a touchscreen display's dynamic transmitters are strategically cyclically modulated so as to preclude the touchscreen display from failing to detect a point of contact. The strategic modulating of the dynamic transmitters of the touchscreen display with a particular configuration (a transmitter system comprising two MEMS micromirrors and a receiver system comprising light distributing sensors in conjunction with photodiodes as discussed above and illustrated previously in FIG. 2) in accordance with embodiments of the invention is illustrated in FIG. 4. The modulation may be achieved by intermittently "blanking" the lasers, so as to render their respective dynamic transmitter ineffective for the intermittent period of time. Although FIG. 4 demonstrates this cycling in accordance with a particular configuration of a touchscreen display, it should of course be understood that the principles underlying this disclosed method may be applied to other configurations and should not be understood to be exclusively applicable to the particular configuration illustrated.

FIG. 4 refers to the touchscreen display of FIG. 2, and depicts two related graphs 401 and 402, with synchronized time scales, that demonstrate how the infrared semiconductor lasers 212 and 214 may be strategically blanked in accordance with embodiments of the invention. Generally, the infrared semiconductor lasers 212 and 214 are effectively intermittently blanked so that: (1) at any given time, one dynamic transmitter is operational; and (2) each dynamic transmitter emits a light beam through one direction of rotation. Specifically, referring to FIG. 4 in view of FIG. 2, the touchscreen display is configured so that during a period of time 410 a first infrared semiconductor laser 212 (designated Laser 1 on graph 401) is on, but a second infrared semiconductor laser 214 (designated Laser 2 on graph 401) is off. During this same period of time 410, the MEMS micromirrors 208 and 210 make a complete sweep through their angles of rotation in one direction. The result is that during period of time 410, only the dynamic transmitter associated with MEMS micromirror 208 is effective. Similarly, during period of time 420 (which immediately follows period of time 410), the second infrared semiconductor laser 214 is on, but the first infrared semiconductor laser 212 is off. During this same period of time 420, the MEMS micromirrors 208 and 210 make a complete sweep through their angles of rotation in the other direction. The result is that during period of time 420, only the dynamic transmitter associated with MEMS micromirror 210 is effective, while the mirror is scanning in the other direction. This cyclic pattern repeats.

The cycling precludes the situation where a point of contact would, for example, block the light beam being reflected from MEMS micromirror 208 and targeted toward a first light distributing sensor 204, but would not block the light beam being simultaneously reflected from MEMS micromirror 210, and targeted toward the same light distributing sensor 204. If this situation were to result, the touchscreen display would erroneously determine that the surface of interest has not been contacted. The dynamic transmitters may be scanned at a high enough rate that the touchscreen display is able to effectively discern contact with the surface of interest. Although the timing shown in FIG. 4 involves only having one infrared semiconductor laser emitting light at a given point in time, the switching can be coordinated so that both semiconductor lasers are emitting light simultaneously at certain times and the rotation of the MEMS micromirrors is coordinated so that the beams are not incident on the same light distributing sensor at the same time. In many embodiments, the synchronous or asynchronous timing of pulses from light sources is coordinated in conjunction with the timing of the MEMS micromirror oscillations or other dynamic transmitter motions. In a number of embodiments, wavelength differences between the light sources in conjunction with wavelength specific light receivers are used to enhance the ability of the system to determine the source of a received light beam.

Touchscreen Displays with Enhanced User Interactivity

Figure 5:
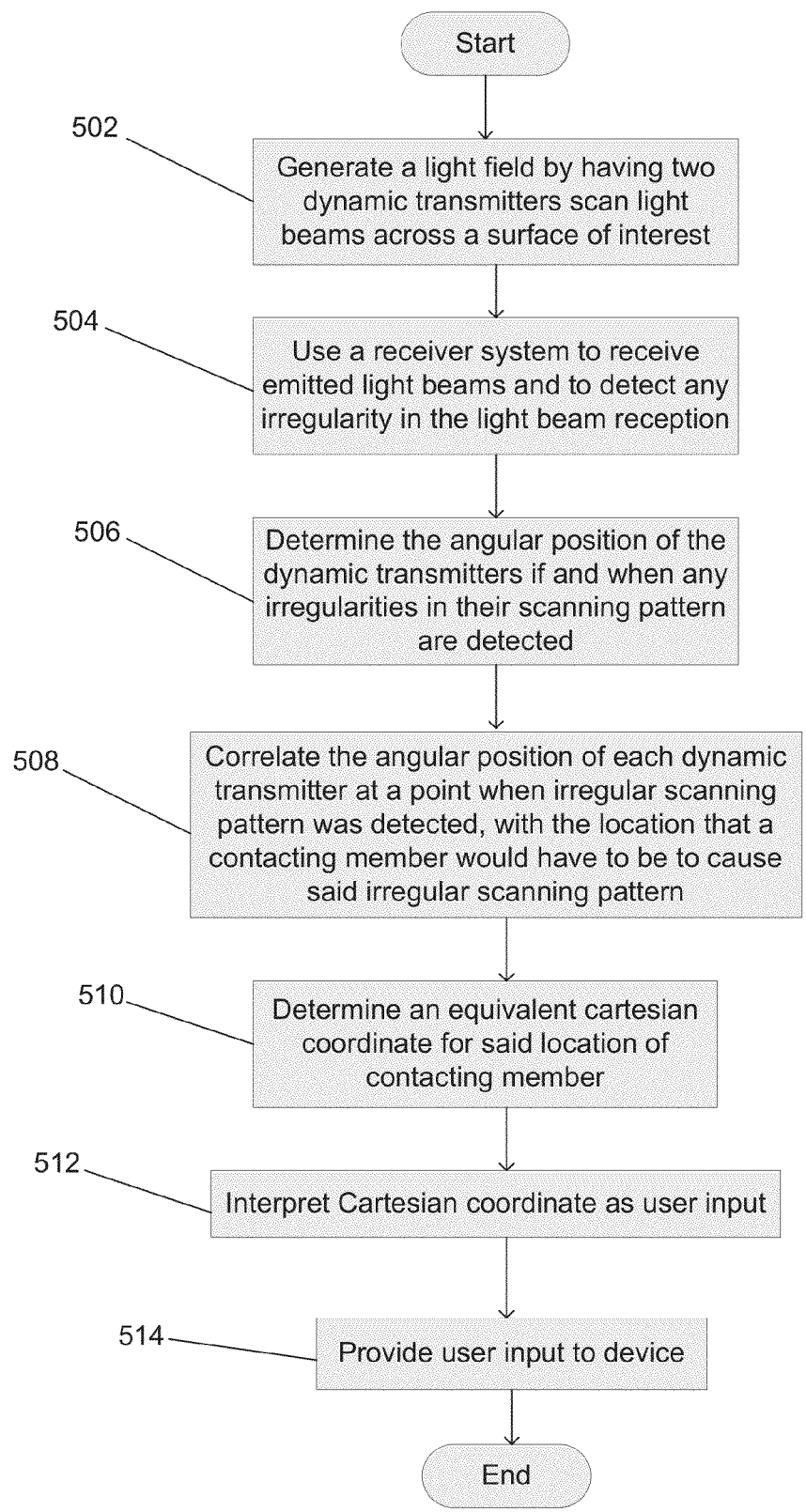
FIG. 5 illustrates a process for achieving a touchscreen display with enhanced user interactivity in accordance with an embodiment of the invention.

In several embodiments of the invention, a touchscreen display is particularly configured for enhanced, gesture-based, user interactivity. One exemplary process regarding how a touchscreen display may be implemented to provide for enhanced user interactivity in accordance with several embodiments of the invention is shown in FIG. 5.

A light field is generated (502) by having two dynamic transmitters scan light beams above and across a surface of interest. In some embodiments, the dynamic transmitters may be implemented by MEMS micromirrors in conjunction with a light source as previously described above. In other embodiments the dynamic transmitter may include electro-optical, opto-mechanical, electromechanical, or magnetic systems. In yet other embodiments, the dynamic transmitters may derive from reflective, refractive, diffractive, phase, interferometric reflective, or transmissive optical principles. The dynamic transmitters have regular scanning patterns. In other embodiments, a light field is generated using a single dynamic transmitter.

A receiver system is used (504) to receive light beams emitted from the dynamic transmitters and to detect any irregularity in light beam reception. In some embodiments, the receiver system may include photodiodes used in conjunction with light distributing sensors, as described above. In other embodiments, the receiver system may include an array of waveguide receive lenses, as described below. The receive system may further include a processor to perform any requisite computations. Because the dynamic transmitters have regular scanning patterns, there is an associated regular pattern of light beam reception. A receiver system may be configured to detect any irregularities in light beam reception, which are due to a contacting member obstructing the lines of sight between the dynamic transmitters and the receiver system.

The angular position of the dynamic transmitters when an irregular scanning pattern is detected may be determined (506), since the dynamic transmitters may be a known function of a known applied voltage.

The angular position of each dynamic transmitter at a point in time when an irregularity in light beam reception was detected, is correlated (508) to a location on the surface of a display where a contacting member would have to be in order to cause the irregular scanning pattern that was detected. In many embodiments, the triangulation process discussed above is used to correlate the angular position of multiple dynamic transmitters with a location of contact. In several embodiments, the scanning of the dynamic transmitter is driven by a signal synchronized to a clock signal and the processor can utilize the clock signal when irregularities in light beam reception occur to determine the angular rotation of the dynamic transmitter. In this way, the processor can triangulate the position of contacts with a surface of interest primarily using timing information. Where an array of light detects is utilized, the processor can triangulate the position of contacts based upon the spatial location of the light detectors. In many embodiments, a combination of the angular position of the dynamic transmitter(s), timing information, and/or the spatial position of a light detector that observed an irregularity in the light beam reception can be utilized to determine the position of a contact with the surface of interest.

A Cartesian coordinate for the location of a contacting member causing the detected irregular scanning pattern is determined (510). In some embodiments of the invention, the triangulation method described above is used to derive the Cartesian coordinate of the contacting member.

A Cartesian coordinate of a contacting member is interpreted (512) as an input, and the input is provided (514) to a touchscreen device.

A touchscreen device may use the input in a variety of ways. In some embodiments of the invention, device software may be configured to recognize continuous input from a small object, such as (but not limited to) a stylus, as 'handwriting,' and thus, the software may be capable of simulating a handwriting experience. In other embodiments, device software may be configured to recognize continuous input as gesture-based interaction with the device. In yet other embodiments, device software may be configured to recognized user input in conjunction with a painting program so as to simulate a painting experience. In other embodiments of the invention, device software may be configured to be able to interpret multiple contact points (e.g., 'multitouch') as a distinct user input.

The above description regarding principles and embodiments related to a process for creating touchscreen displays with enhanced user interactivity is not meant to be exhaustive. The above discussion, is merely meant to be illustrative. It should be understood that the principles and embodiments may be implemented in any number of ways in accordance with embodiments of the invention.

Figure 6:
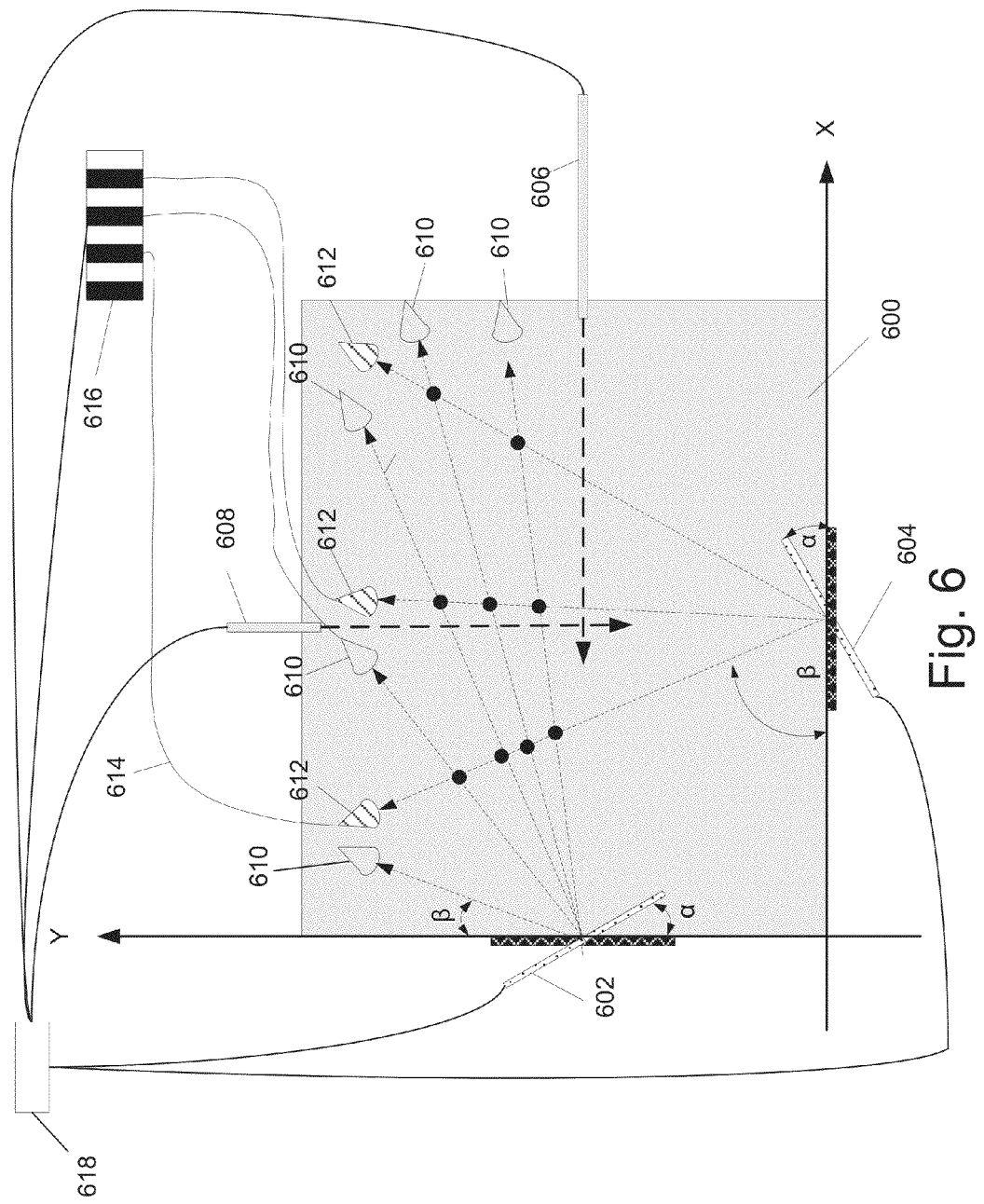
FIG. 6 illustrates a touchscreen display that implements two dynamic transmitters in conjunction with waveguide receive lenses in accordance with an embodiment of the invention.

Touchscreen Displays that Utilize an Array of Receiving/Detecting Elements to Aid in the Determination of a Location of Contact Touchscreen displays in accordance with embodiments of the invention can incorporate an array of light beam receiving/detecting elements, which may be implemented using polymer waveguide receive lenses, or they may be photodiodes. A touchscreen display that utilizes two dynamic transmitters as its transmitter system and utilizes an array of waveguide receive lenses as part of its receiver system in accordance with embodiments of the invention is illustrated in FIG. 6. The surface of interest 600 is rectangular in shape, and MEMS micromirrors 602 and 604 are placed at the midpoints of perpendicular edges of the surface of interest 600. Light sources 606 and 608 are located across from MEMS micromirrors 602 and 604 respectively, and direct light to them respectively. The MEMS micromirrors 602 and 604 are each configured to swivel about an axis that is perpendicular to the surface of interest and coincident with their respective midpoints. The MEMS micromirrors 602 and 604 are further arranged to reflect incident light beams received from their respective light sources 606 and 608 across the surface of interest 600, so as to scan them.

The system utilizes a receiver system that includes a set of waveguide receive lenses 610 that is configured to receive light beams reflected from MEMS micromirror 602 and another set of waveguide receive lenses 612 that is configured to receive light beams reflected from MEMS micromirror 604. The sets of waveguide receive lenses 610 and 612 are arranged so that each lens receives a reflected light beam when the corresponding MEMS micromirror is at a particular angular position. The waveguide receive lenses transmit incident light through waveguide light pipes 614 to a CMOS Linear Array of Pixel Cells 616, which facilitates the computation of a contact point, by acting as a light detecting system and signaling the reception of incident light to an associated processor 618. In other embodiments, any of a variety of light detection devices can be used to detect incident light.

In this illustrated embodiment, the touchscreen device is configured to function as follows. Light is emitted from light sources 606 and 608 and reflected off of MEMS micromirrors 602 and 604, which are each swiveling in an oscillatory fashion through an angle. The reflected light beams thus scan over the surface of interest, and are received by waveguide receive lenses 610 and 612. Specifically, waveguide receive lenses 610 are configured to receive light beams reflected from a first MEMS micromirror 602, and waveguide receive lenses 612 are configured to receive light beams reflected from a second MEMS micromirror 604. The waveguide receive lenses signal the reception of light to the CMOS Linear Array of Pixel Cells 616 via respective waveguide light pipes 614. The receive waveguide system is configured so that when the surface of interest 600 is contacted, the contacting member obstructs certain of the waveguide receive lenses 610 and 612 from receiving the light beams reflected by the MEMS micromirrors 602 and 604. Specifically, the contacting member will disrupt one of the waveguide receive lenses 610 that is configured to receive the light beam reflected by the first MEMS micromirror 602, and it will also disrupt one of the waveguide receive lenses 612 that is configured to receive the light beam reflected by the second MEMS micromirror 604. These waveguide receiver lenses 610 and 612 communicate the disruption of the reception of light to the CMOS Linear Array of Pixel Cells 616, which then sends a corresponding signal to the associated processor 618. Because each waveguide receive lens 610 and 612 is configured to receive a light beam from a particular dynamic transmitter when it is at a particular angular position, the processor can compute the location of the contact point in any number of ways, including: (1) evaluating which sensors had their signals disrupted; (2) evaluating the angular position of the dynamic transmitters at moment of contact; or (3) evaluating both which sensors were disrupted and the angular position of the MEMS micromirrors at the moment of contact. The MEMS micromirrors scan above the surface of interest at a high enough frequency to enable this result.

Figure 7:
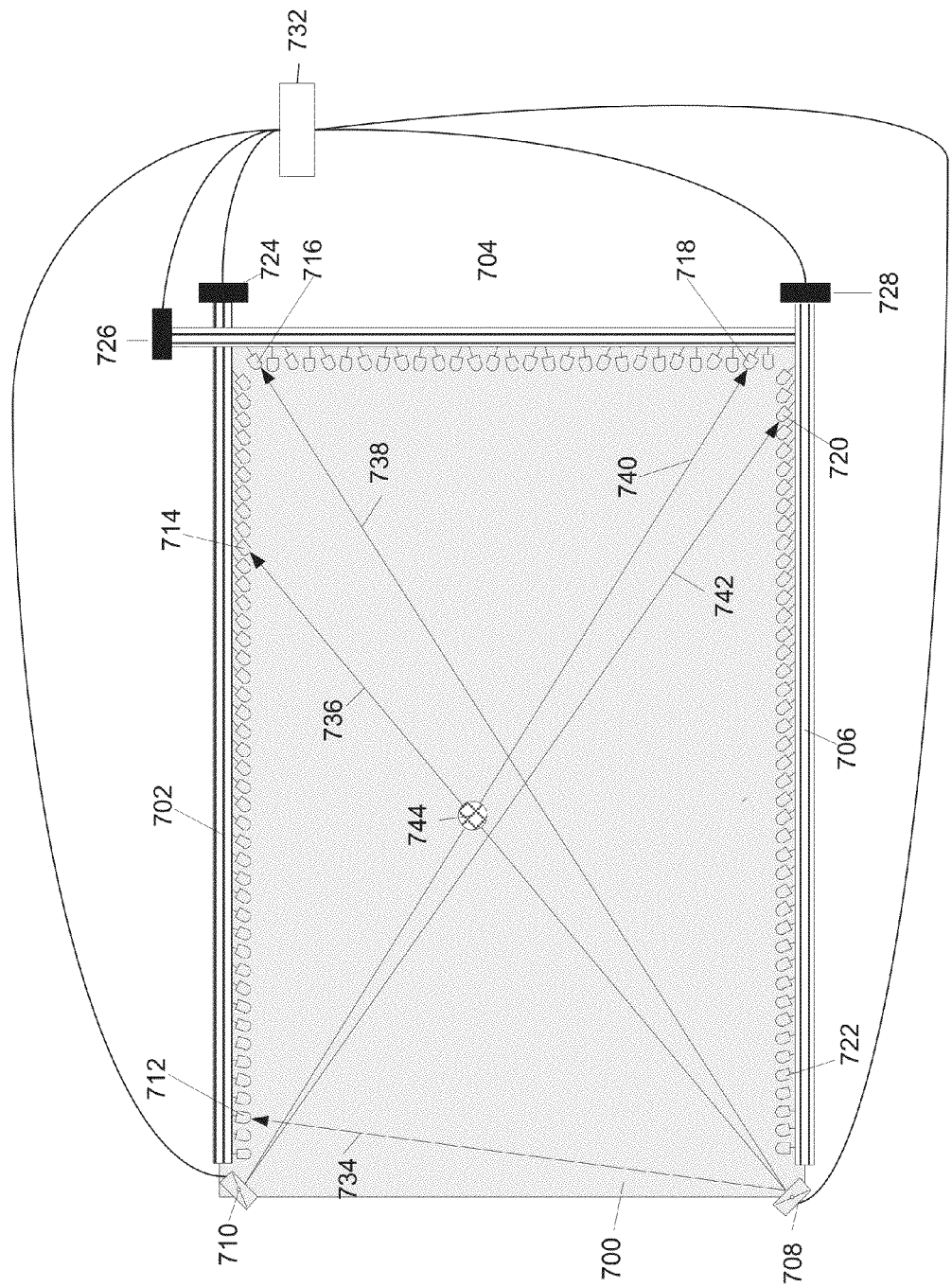
FIG. 7 illustrates a touchscreen display that utilizes two dynamic transmitters in conjunction with an array of waveguide receive lenses in accordance with an embodiment of the invention.

Yet another embodiment of a touchscreen display that utilizes two dynamic transmitters as its transmitter system and utilizes an array of sensors as its receive system in accordance with embodiments of the invention is illustrated in FIG. 7. The surface of interest 700 is rectangular in shape and bounded along three edges by waveguide systems 702, 704, and 706. One edge of the surface of interest is not bounded by a distributing light sensor; dynamic transmitters, 708 and 710, are located at each end point of this edge. The dynamic transmitters 708 and 710 faces in towards the surface of interest 700. The dynamic transmitters 708 and 710 are configured to be able to swivel about an axis perpendicular to the face of the surface of interest 700. They swivel through an angle that is approximately confined within the right angle formed by the edges of the surface of interest that are adjacent to each respective dynamic transmitter 708 and 710. An array of waveguide receive lens is placed alongside each of the waveguide systems 702, 704, and 706. Some of the waveguide receive lenses, e.g., 712, 714, 716, are configured to receive light beams emitted from dynamic transmitter 708, while the other waveguide receive lenses, e.g., 718, 720, 722, are configured to receive light beams emitted from a dynamic transmitter 710. Each of the waveguide receive lenses is configured to receive its corresponding light beam when the respective dynamic transmitter is at a particular angular position. Each of the bounding waveguide systems 702, 704, and 706 has an attached light detecting system 724, 726, 728 respectively. The light detecting system 724, 726, and 728 and the dynamic transmitters 708 and 710 are connected to a processor 732.

In this illustrated embodiment, the touchscreen device is configured to function as follows. Each of the dynamic transmitters 708 and 710 is continually scanning light beams across the surface of interest in a known fashion. Exemplary trajectories 734, 736, and 738 demonstrate trajectories that the light beam emitted from dynamic transmitter 708 may undertake as it scans above the surface of interest 700. The light beam emitted by dynamic transmitter 710 is received by a corresponding receive waveguide lens, e.g. 712, 714, 716. Exemplary trajectories 740 and 742 demonstrate trajectories that the light beam emitted from dynamic transmitter 710 may undertake as it scans above the surface of interest 700. The light beam emitted by dynamic transmitter 710 is also received by a corresponding receive waveguide lens, e.g., 718, 720, 722.

When the surface of interest 700 is contacted, the contacting member disturbs the light beam receiving process. For example, when surface of interest 700 is contacted at contact point 744, waveguide receive lenses 714 and 718 are precluded from receiving the light beams as they transmit through trajectories 736 and 740 respectively. The waveguide receive lenses communicate either the presence or absence of light through their respective waveguide system 702, 704, 706 to the respective light detecting system 724, 726, 728, which sends an appropriate signal to the processor 732.

The waveguide system 702, 704, 706 may be implemented by, but is not limited to: (1) a single waveguide channel that is connected to every waveguide lens receiver along the waveguide system so that the light detector discerns any light incident upon an edge of the surface of interest; or (2) multiple waveguide channels that are connected to distinct waveguide receive lenses so that the light detector can discern precisely which of the waveguide receive lenses is receiving light. However the waveguide systems are configured, the respective light detecting systems communicate the result of the signal (either the absence or presence of incident light) to the processor 732.

The processor 732 is programmed to determine when the surface of interest 700 has been contacted and the location of the contact, in accordance with embodiments of the invention. The processor may discern the presence and location of a contact in a number of ways, including: (1) by evaluating which of the array of waveguide receive lenses relayed an absence of light due a contacting member blocking its reception; (2) by evaluating the angular position of each of the dynamic transmitters when a contacting member is blocking the reception of light by a waveguide receive lens; or (3) by evaluating both which of the array of waveguide receive lenses is relaying an absence of light due to a contacting member and the angular position of each of the dynamic transmitters when the 'disrupting' signal is reported. The dynamic transmitters scan above the surface of interest at a high enough frequency to enable this result.

Again, these further described principles and embodiments should not be misinterpreted to exclusively encompass their respective discussed illustrations. Instead, the embodiments described and related underlying principles may be applied to any number of configurations in accordance with further embodiments of the invention. Moreover, additional embodiments are described below.

Touchscreen Displays with Alternate Transmitter System Configurations

Touchscreen displays in accordance with many embodiments of the invention utilize varying dynamic transmitter configurations. For example, certain embodiments related to touchscreen displays may include dynamic transmitters that emit more than one light beam, while other such embodiments may utilize more than two dynamic transmitters, while yet other such embodiments utilize more than two dynamic transmitters, while yet other such embodiments regard dynamic transmitters that scan a light beam vertically.

Figure 8:
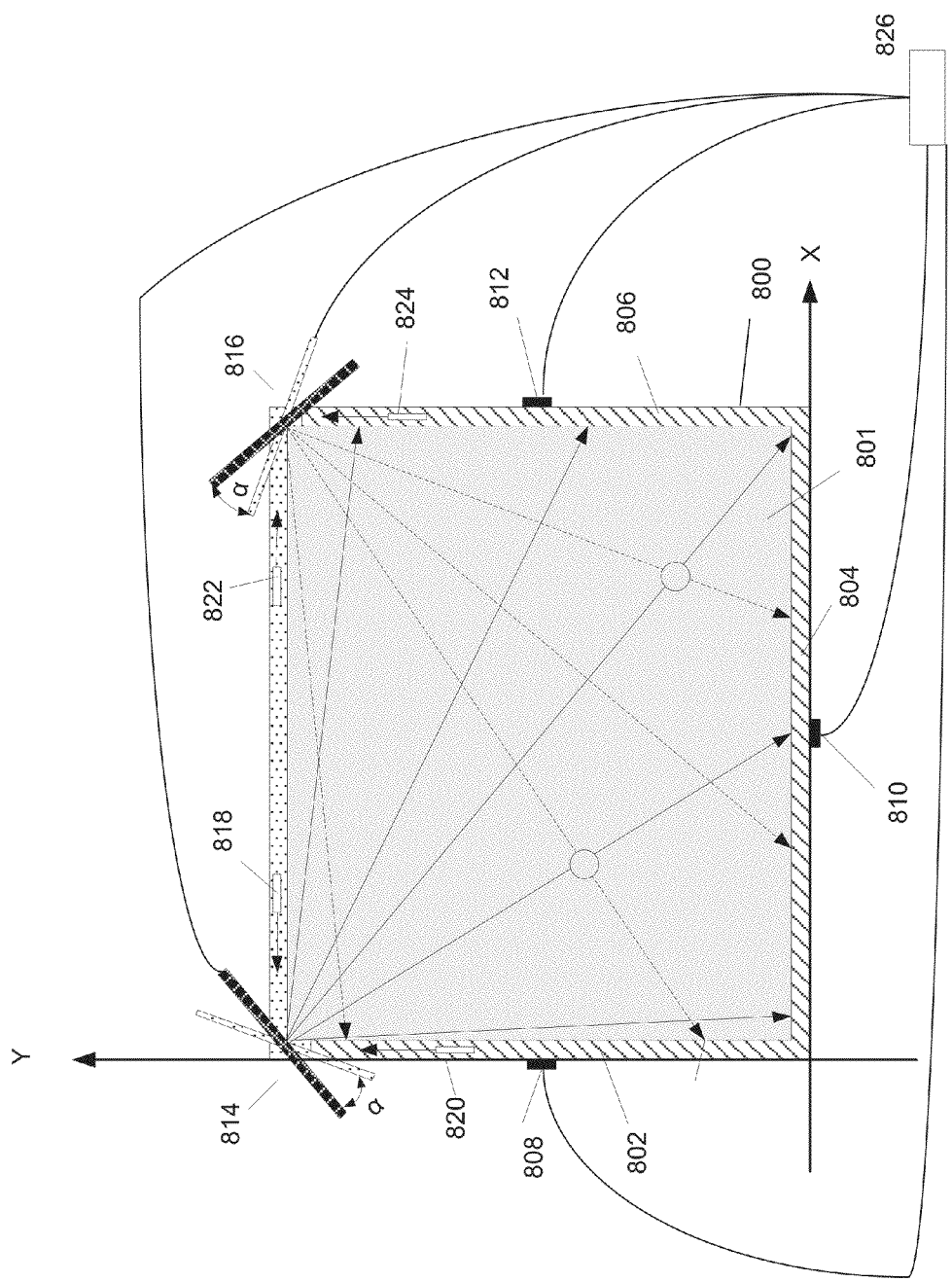
FIG. 8 illustrates a touchscreen display that utilizes dynamic transmitters that each transmit multiple light beams in accordance with an embodiment of the invention.

A touchscreen display that utilizes two dynamic transmitters that each emit multiple light beams in accordance with embodiments of the invention is illustrated in FIG. 8. The touchscreen display 800 illustrated in FIG. 8 includes a surface of interest 801 that is rectangular in shape, and is bounded on three edges by light distributing sensors 802, 804, and 806, which are each connected to a corresponding photodiode 808, 810, and 812. Note also that in other embodiments of the invention, a touchscreen display's surface of interest may be bounded on all four sides by light distributing sensors. The dynamic transmitters include MEMS micromirrors 814 and 816 utilized in conjunction with light sources 818, 820, 822, and 824. Specifically, MEMS micromirror 814 is used in conjunction with light sources 818 and 820, which each emit light onto MEMS micromirror 814 from a different location. Similarly, MEMS micromirror 816 is used in conjunction with light sources 822 and 824, which also each emit light onto MEMS micromirror 816 from a different location. Note that as before, the photodiodes 808, 812, 814 and the dynamic transmitters 814, 816 are connected to an associated microprocessor 826. This illustrated embodiment functions in a manner similar to previously discussed embodiments, i.e. scanning light beams across a surface of interest and determining any contact points based on any disruptions of the light beam-scanning process. The use of dynamic transmitters that transmit multiple light beams decreases the angle that the dynamic transmitters swivel through to sufficiently scan the surface of interest so as to be able to detect points of contact.

Figure 9:
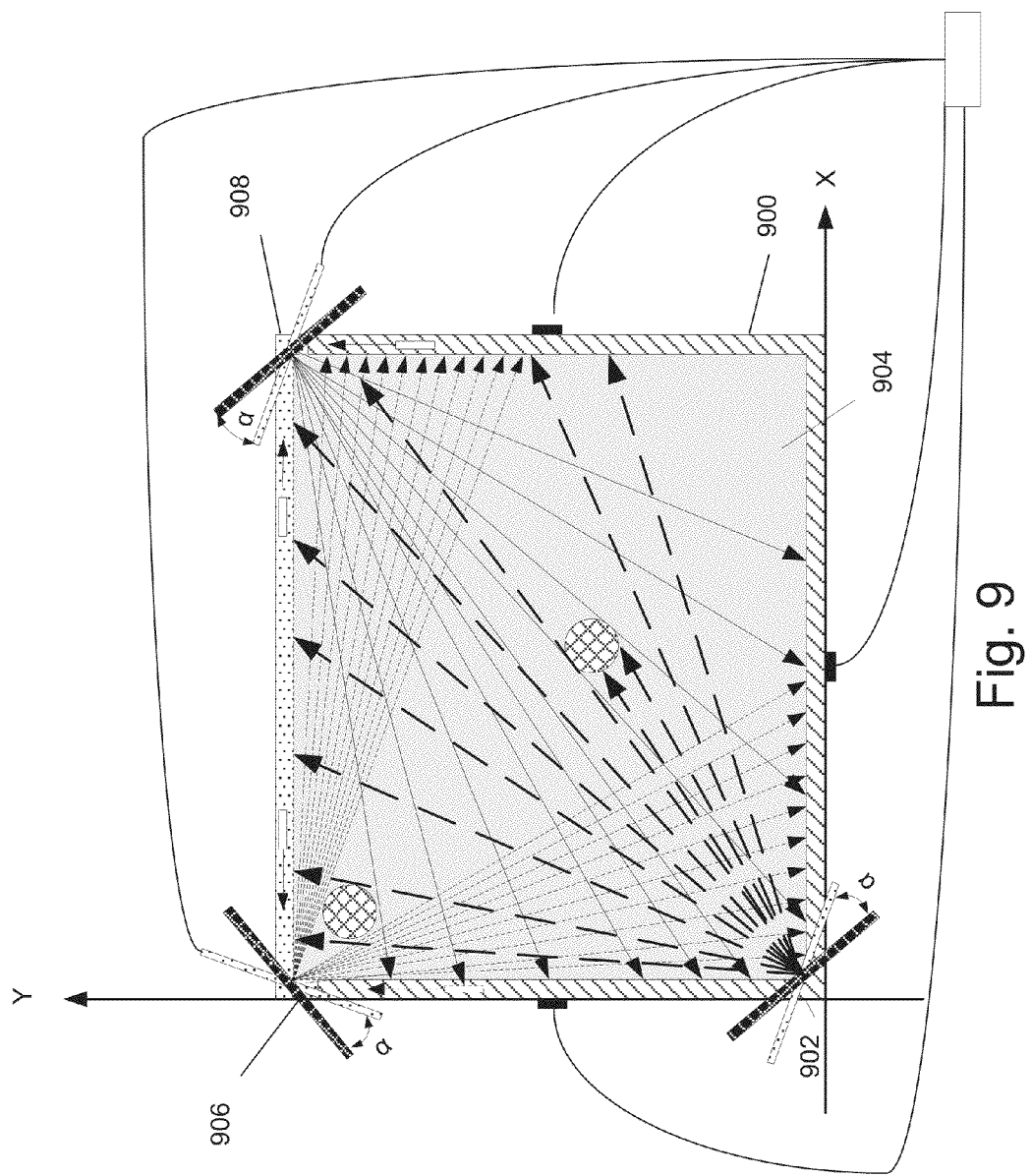
FIG. 9 illustrates a touchscreen display that utilizes two dynamic transmitters in conjunction with a MEMS micromirror in accordance with an embodiment of the invention.

A touch screen display that utilizes three dynamic transmitters in accordance with embodiments of the invention is illustrated in FIG. 9. This illustrated touchscreen display 900 is similar to that in FIG. 8, except that a third dynamic transmitter in the form of a MEMS micromirror 902 is placed at a third corner of the surface of interest 904. The MEMS micromirror 902 reflects incident light reflected by the other MEMS micromirrors 906 and 908. The use of a third dynamic transmitter enhances the scanning coverage of the surface of interest. Again, this embodiment functions in a manner largely similar to that of the previous described embodiments.

Figure 10:
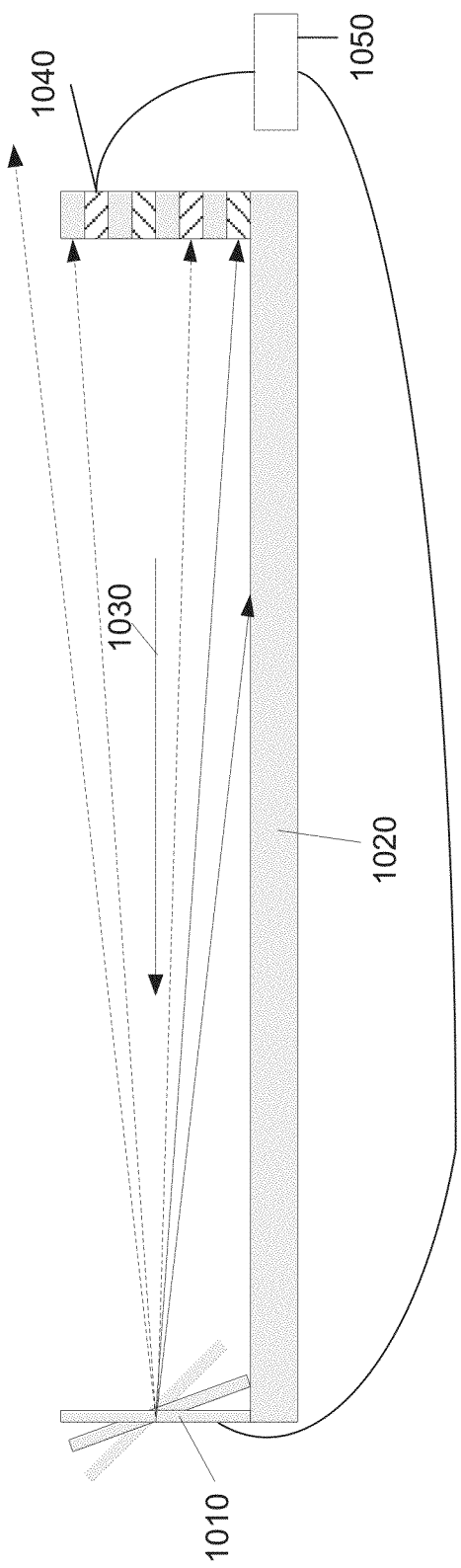
FIG. 10 illustrates a touchscreen display that utilizes a dynamic transmitter that scans a light beam in a direction out of the plane of the surface of the touchscreen display in accordance with an embodiment of the invention.

A dynamic transmitter that is configured to scan a light beam in a direction that is out of the plane of the surface of interest and thereby determine the depth at which a contacting member contacts a surface of interest in accordance with embodiments of the invention is illustrated in FIG. 10. A dynamic transmitter in the form of a MEMS micromirror 1010 is placed above one edge of a surface of interest 1020. A ray of light 1030 is directed toward the MEMS micromirror 1010 while it swivels about its horizontal central axis, thereby scanning the reflected light beam above the surface of interest 1020 in a controlled manner. Photodetecting sensors 1040 may be placed across the surface of interest to receive the emitted light beam, and arranged so that they can receive the emitted light beam at its various heights. As before, the photodetecting 1040 sensors and the dynamic transmitter are connected to a processor 1050. The system functions in a manner similar to that described previously. Namely, a contacting member will necessarily obstruct regular light beam reception. The time at which this obstruction occurs may be correlated with the angular position of the dynamic transmitter to determine the depth of the obstruction. Alternatively, the depth of the contacting member may be determined by evaluating which of the discrete photodetecting sensors 1040 is indicating a disruption in the regular reception of light beams.

In a number of embodiments, a frame, independent of a physical reference surface, can define a virtual surface or free space region enabling touch and gesture control in free space based on a dynamic transmitter in conjunction with a distributive light sensor (or any other form of sensor appropriate to a specific application). The dynamic transmitters and corresponding receiver system can be supported by this frame in combination with the structures and/or functionality of any of the embodiments of the invention described above.

Again, the above discussion relating to touchscreen displays that utilize alternative dynamic transmitter configurations is not meant to be exhaustive. It should be understood that these embodiments are merely illustrative, and the underlying principles regarding using these alternate configurations may be utilized in any number of configurations in further accordance with embodiments of the invention. Moreover, the underlying principles may be implemented in any number of ways.

Figure 11:
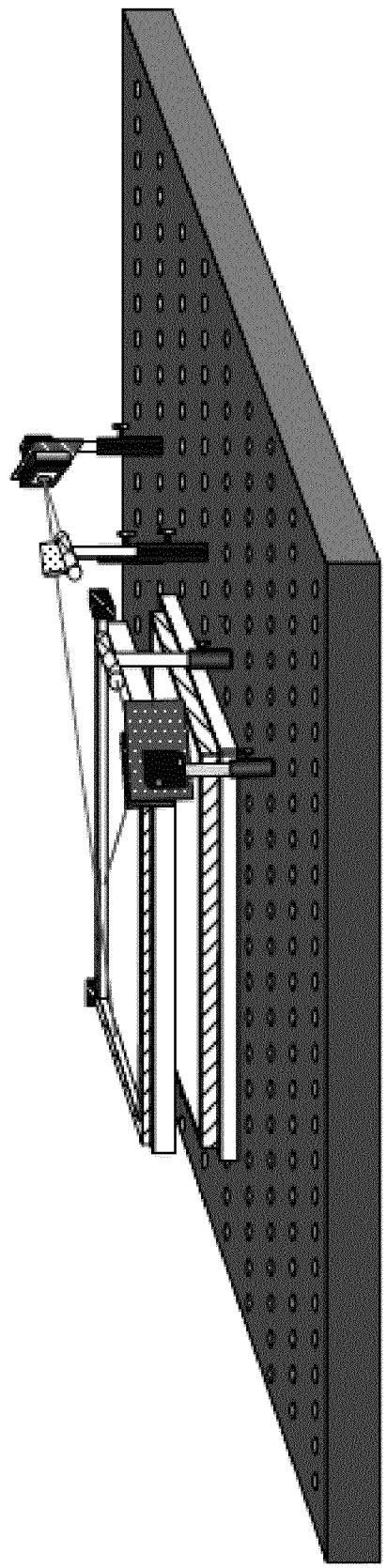
FIG. 11 illustrates a touchscreen display that transmits light through free space in accordance with embodiments of the invention.

Touchscreen Displays that Utilize Transmitter Systems that Emit Light Beams through Transmissive Bodies In certain embodiments of the invention, dynamic transmitters transmit light beams through free space, as in FIG. 11 for example. In these embodiments, a contacting member directly obstructs light beam reception, which thereafter allows the location of contact to be determined (as thoroughly discussed above). However, in other embodiments, the light beams may be transmitted through a transmissive body. In these embodiments, a contacting member will not directly obstruct light beam emission and reception, but instead will locally distort the optics of the transmissive body and thereby obstruct light beam reception. The location of one or more contact points may then be determined in a manner similar to how the determination was made for free space bodies.

Figure 12A:
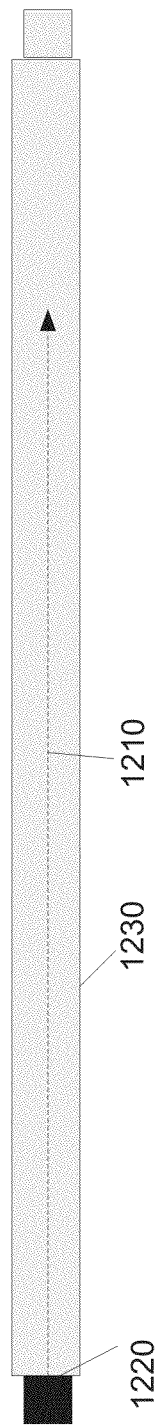
FIG. 12A depicts a profile view of a touchscreen display that transmits light beams through a transmissive body in accordance with an embodiment of the invention.
Figure 12B:
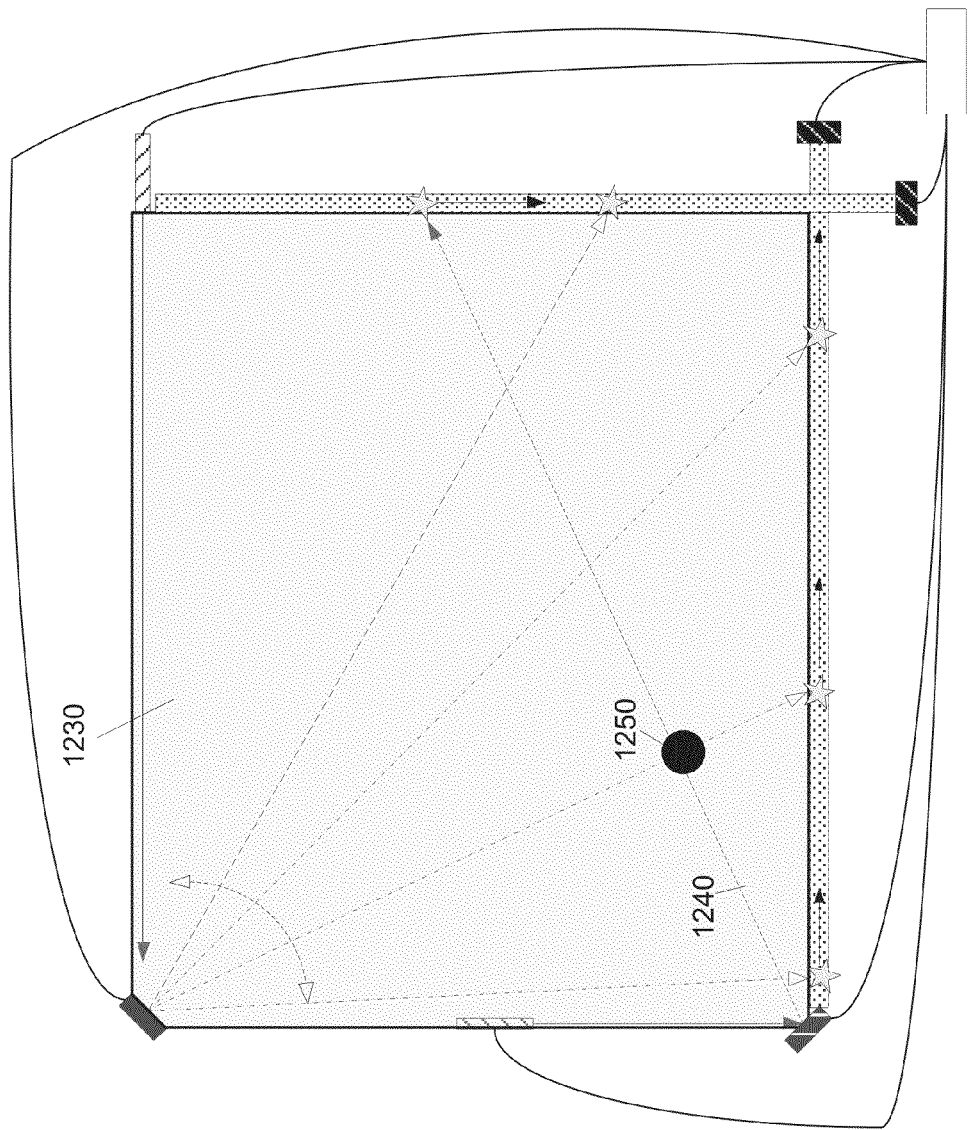
FIG. 12B illustrates a touchscreen display that transmits light beams through a transmissive body in accordance with an embodiment of the invention.

A touchscreen display that transmits light beams through a transmissive body in accordance with embodiments of the invention is illustrated in FIGS. 12A and 12B. FIG. 12A shows a cross section of an embodiment that transmits light beams through a transmissive body. Specifically, light beam 1210 is emitted from dynamic transmitter 1220 through transmissive body 1230. The configuration of the embodiment is depicted in FIG. 12B, and is similar to that seen in FIG. 8, with the essential difference being that the light beams are emitted through a transmissive body 1230. The trajectory of the second dynamic transmitter's light beam 1240 is shown. When the transmissive body (essentially the surface of interest) 1230 is contacted, for example at contact point 1250, the contacting member locally distorts the optics of the transmissive body 1230 and interferes with clear light beam reception by the receiver system. Thus, the location of any contact points may be determined using a process similar to the processes described above.

Figure 13A:
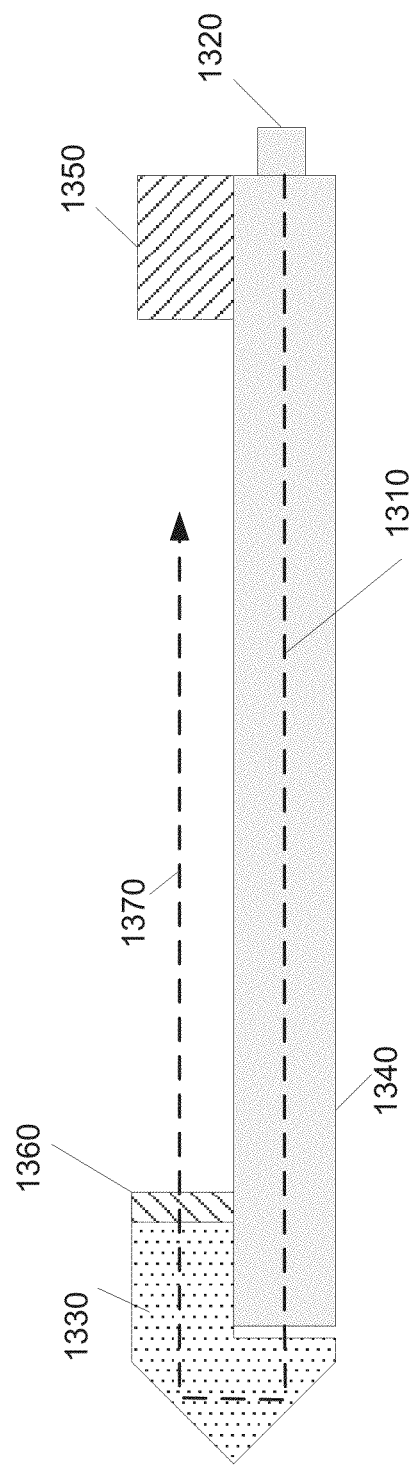
FIG. 13A depicts a profile view of a touchscreen display that simulates the emission of a Cartesian-type grid in accordance with embodiments of the invention.
Figure 13B:
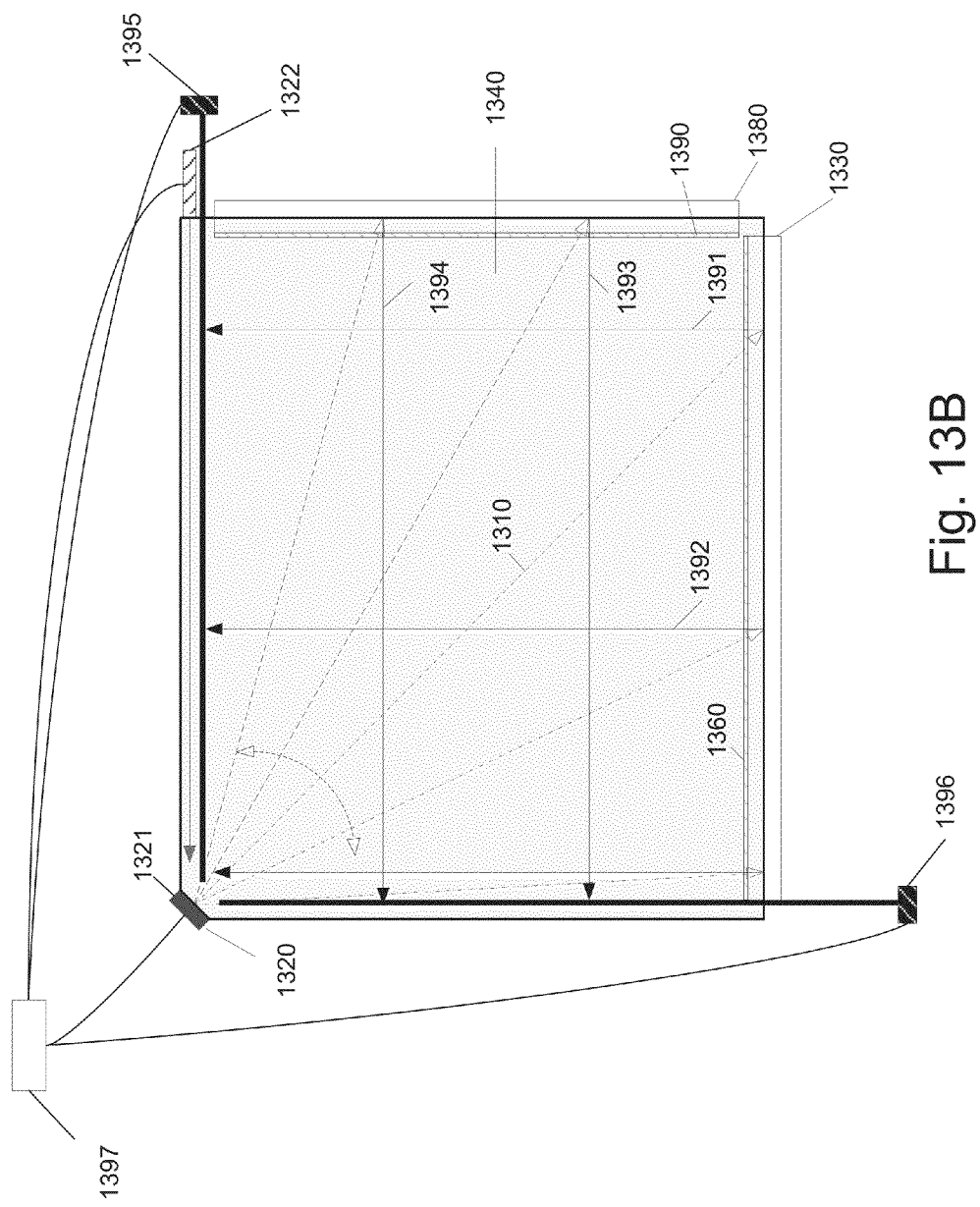
FIG. 13B illustrates a touchscreen display that simulates the emission of a Cartesian-type grid in accordance with an embodiment of the invention.

Touchscreen Displays that Simulate the emission of a Cartesian-Type Grid of Light Beams While the touchscreen displays discussed above have utilized dynamic transmitters that emit light beams radially, touchscreen displays in accordance with many embodiments of the invention simulate the emission of a Cartesian-type grid of light beams. A touchscreen display that redirects a light beam emitted from a dynamic transmitter so as to simulate the emission of a Cartesian type grid in accordance with an embodiment of the invention is illustrated in FIGS. 13A and 13B. FIG. 13A depicts a cross-section of the embodiment and illustrates how the light 1310 emitted from dynamic transmitter 1320 is redirected via a folding mirror piece 1330 back across the surface of interest 1340 to be received by a light detector 1350. Although the light is initially emitted from dynamic transmitter 1320 in a radial fashion, an optical strip 1360 collimates the light beam so that it emerges as collimated light beam 1370 that has a trajectory that is substantially parallel to one edge of the rectangular surface of interest 1340.

FIG. 13B further illustrates how the light beam may be collimated to simulate the emission of a Cartesian-type grid. For example, light beam 1310 is emitted by dynamic transmitter 1320, and is thereafter redirected back across the surface by folding mirror 1330. FIG. 13B illustrates that the dynamic transmitter 1320 may be in the form of a MEMS micromirror 1321 in conjunction with a light source 1322. Although a single dynamic transmitter scanning a single beam is shown, multiple dynamic transmitters and/or multiple beams of light can be scanned by a single dynamic transmitter as appropriate to the requirements of a specific application. Optical strip 1360 collimates the light beam so that as it transmits back across the surface of interest 1340, it is substantially parallel to one edge of the rectangular surface of interest 1340. Similarly, folding mirror 1380 and optical strip 1390 redirect the light beam when it is incident upon their corresponding edge so it becomes perpendicular to the light beams redirected by folding mirror 1360. In this way, while dynamic transmitter 1320 radially emits a light beam, a system of folding mirrors, 1330 and 1380, and optical strips, 1360 and 1390, redirects the light beam so that it simulates the emission of a Cartesian-type grid, that includes exemplar trajectories 1391, 1392, 1393, and 1394. Exemplar trajectories 1391 and 1392 are parallel to one edge of the surface of interest and are received and detected by a configuration that includes a light distributing sensor in conjunction with a photodiode 1395; this configuration 1395 receives and detects those trajectories that are parallel to trajectories 1391 and 1392. Exemplar trajectories 1393 and 1394 are perpendicular to 1391 and 1392 and are received and detected by a configuration that includes a light distributing sensor in conjunction with a photodiode 1396; this configuration 1396 receives and detects those trajectories that are parallel to 1393 and 1394. These receiving and detecting configurations 1395 and 1396, along with the dynamic transmitter 1320, direct appropriate signals to an associated processor 1397, which can perform computations to locate a contact point in accordance with embodiments of the invention described above. For example, the processor may determine the contact point by determining the angular position of the dynamic transmitter when the beam reception process is obstructed. As discussed above, in many embodiments the angular position can be determined based upon the timing of the detected interruption of the dynamically scanned light beam(s).

Although a specific configuration of a touchscreen display that simulates the emission of a Cartesian-type grid of light beams is discussed above, many different configurations also exist that achieve a touchscreen display that simulates the emission of a Cartesian-type grid of light beams in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive.

Touchscreen displays that Scan One Light Beam

Figure 14:
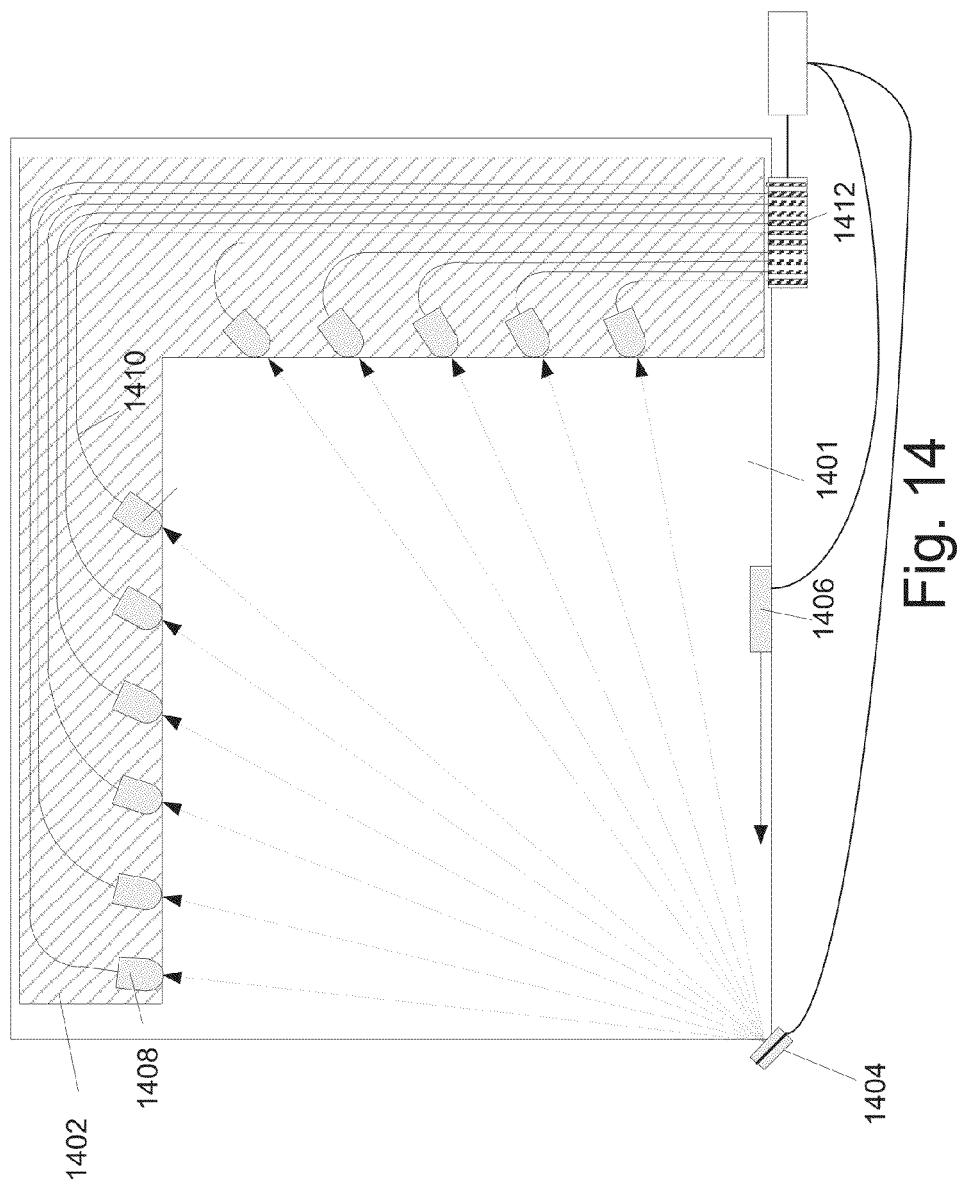
FIG. 14 illustrates a touchscreen display that utilizes a single dynamic transmitter in accordance with an embodiment of the invention.

Other embodiments of the invention regard touchscreen displays that utilize a dynamic transmitter that transmits one light beam. A touchscreen display that utilizes a dynamic transmitter that transmits a single light beam in accordance with embodiments of the invention is illustrated in FIG. 14. The surface of interest 1401 is rectangular in shape, and is bounded by a receive system 1402 along two edges. A dynamic transmitter in the form of a MEMS micromirror 1404 is located at the corner opposite the two edges. A light source 1406 emits a light beam that reflects off the MEMS micromirror as it swivels through an angle approximately bounded by the edges of the surface of interest, thereby scanning the surface of interest. The receive system 1402 may be an array of receive waveguide lenses 1408 in conjunction with corresponding optical fibers 1410 and a light detector 1412, or it may be any other receive system. When the surface of interest is contacted, the contacting member necessarily interrupts the regular emission and reception of the light beam, and the angular position of this location of contact may be determined using a process similar to the processes described above.

Although a specific configuration of a touchscreen display that utilizes one dynamic transmitter is discussed above, many different configurations also achieve a useful touchscreen display that utilizes a single dynamic transmitter in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive.

Figure 15:
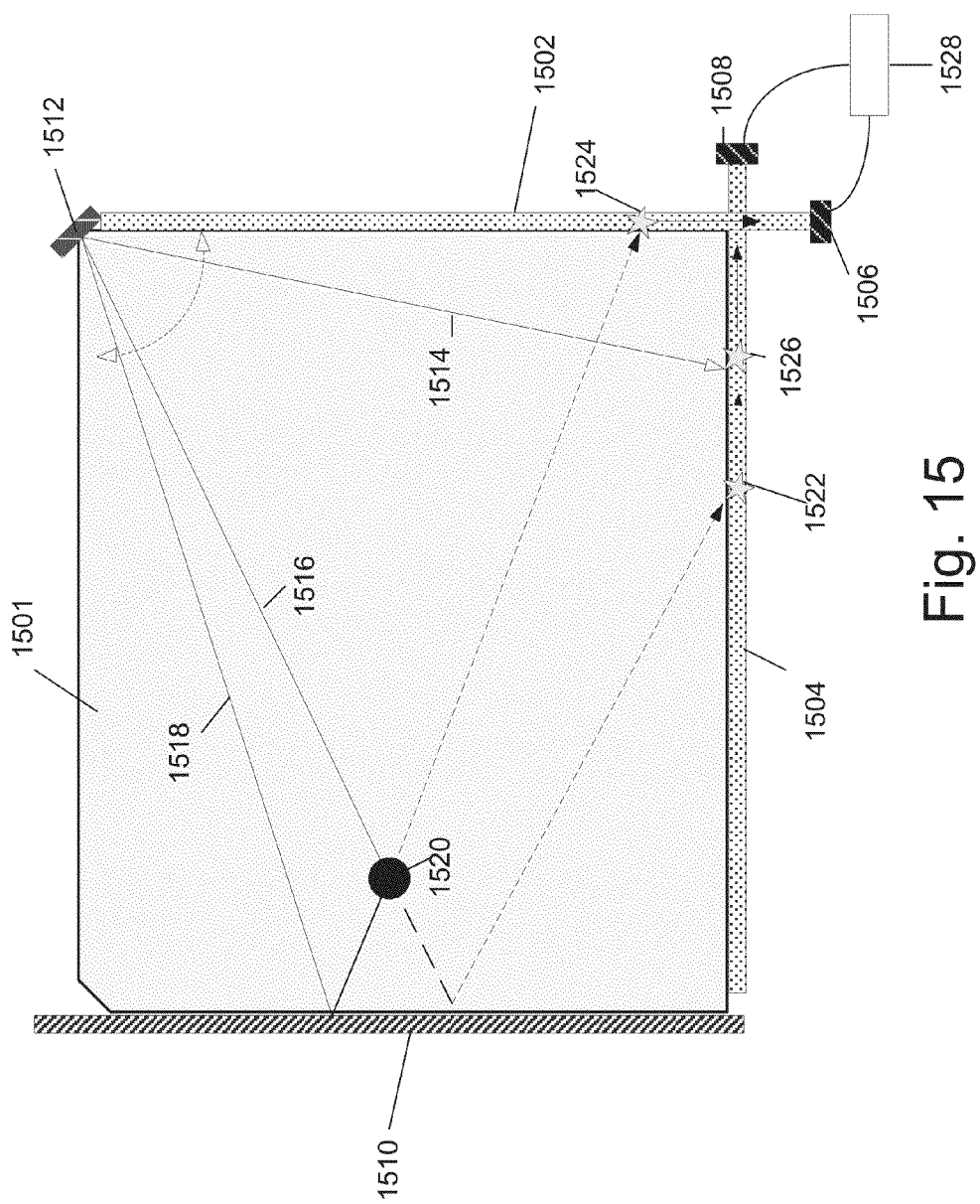
FIG. 15 illustrates a touchscreen display that utilizes a single dynamic transmitter in conjunction with a mirror in accordance with an embodiment of the invention.

Touchscreen Displays that Utilize Dynamic Transmitters in Conjunction with Mirrors In many embodiments of the invention utilize dynamic transmitters in conjunction with a bounding mirror surface. A touchscreen display that utilizes a dynamic transmitter that scans a single light beam across a surface of interest and further utilizes a bounding mirror surface in accordance with many embodiments of the invention is illustrated in FIG. 15. The surface of interest 1501 is rectangular in shape and is bounded on two adjacent edges by a receive system that includes light distributing sensors 1502 and 1504 in conjunction with photodiodes 1506 and 1508. The surface of interest 1501 is further bounded on a third side by a mirror surface 1510 that is capable of reflecting a light beam. A dynamic transmitter 1512 is located at the corner of the surface of interest, between the unbounded edge and one of the light distributing sensors 1502.

The dynamic transmitter 1512 emits a light beam as it swivels through an angle, such that it scans the substantial majority of the surface of interest 1501. The light beam incident on the mirror surface 1510 is reflected toward one of the light distributing sensors 1502 and 1504. Sample light beam trajectories 1514, 1516, 1518 are depicted. Note that light beam trajectories 1516 and 1518 reflect off of mirror surface 1510, and are incident on light distributing sensors 1504 and 1502 respectively. Specifically, a light beam traversing trajectory 1516 would ordinarily, without any obstruction, cause a corresponding reflected light beam to be incident on light distributing sensor 1504 at point 1522. Similarly, a light beam traversing trajectory 1518 would ordinarily, without any obstruction, cause a corresponding reflected light beam to be incident on light distributing sensor 1502 at point 1524. In contrast, a light beam traversing trajectory 1514 would not be reflected off of mirror surface 1510, but would instead be directly incident on light distributing sensor 1504 at point 1526.

Thus, a contact point may be triangulated using a process that identifies the two trajectories that were interrupted and determining the interception of the two trajectories. For example, a contacting member that contacts the surface of interest at point 1520 will interrupt the regular light beam reception in two instances: (1) whereas light distributing sensor 1504 would ordinarily receive incident light via light beam trajectory 1516, the contacting member at contact point 1520 interrupts this regular light beam reception; and (2) whereas light distributing sensor 1502 would ordinarily receive incident light via light beam trajectory 1518, the contacting member at contact point 1520 interrupts this regular light beam reception. Thus, in accordance with embodiments of the invention described above, photodiodes 1506 and 1508 indicate regular/irregular light beam reception to microprocessor 1528, which may then triangulate the contact point.

Figure 16:
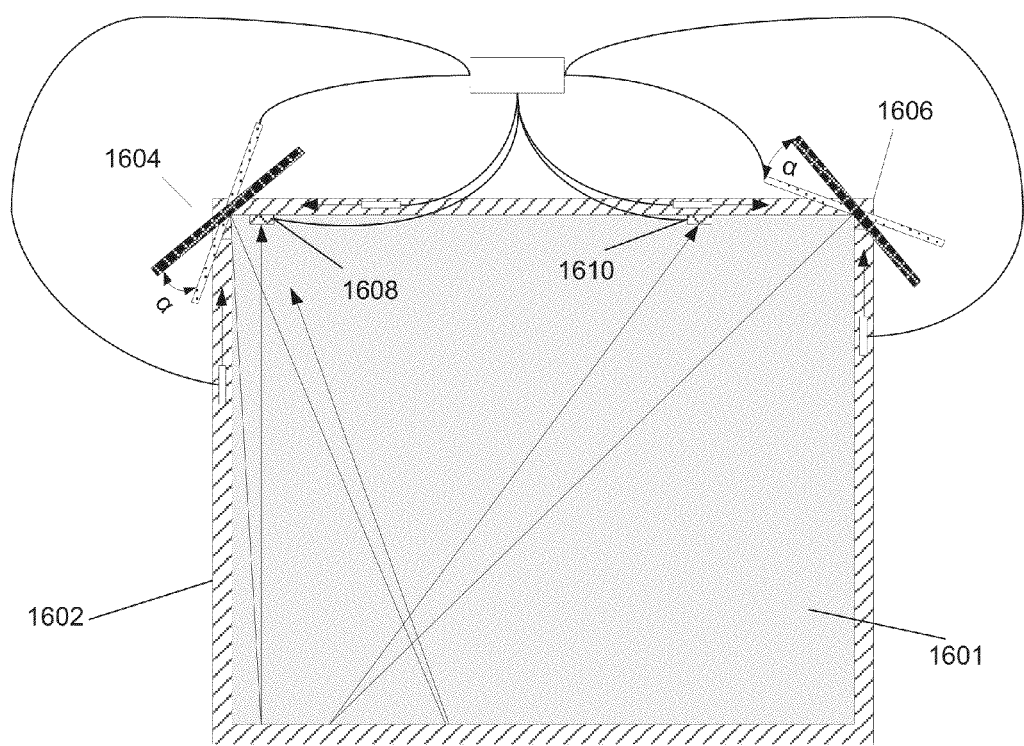
FIG. 16 illustrates a touchscreen display that utilizes multiple dynamic transmitters in conjunction with several bounding mirror surfaces in accordance with an embodiment of the invention.

A touchscreen display that includes multiple dynamic transmitters in conjunction with multiple bounding mirror surfaces is illustrated in FIG. 16. The rectangular surface of interest 1601 is bounded by mirror surfaces 1602 on at least one of the four sides. Two dynamic transmitters 1604 and 1606, in the form of MEMS micromirrors in conjunction with light sources, are located at adjacent corners of the surface of interest 1601. Photodiodes 1608 and 1610 are located in the immediate vicinity of the dynamic transmitters 1604 and 1606, correspond to them respectively. The mirror surfaces are configured to redirect the light beams emitted from the dynamic transmitters 1604 and 1606 to their corresponding photodiodes 1608 and 1610. This illustrated embodiment functions in a manner similar to previously discussed embodiments, i.e. scanning light beams across a surface of interest and determining any contact points based on any disruptions of the light beam-scanning process, that are detected by the photodiodes 1608 and 1610.

Although specific configurations of touchscreen displays that utilize dynamic transmitters in conjunction with bounding mirror surfaces are discussed above, many different configurations of touchscreen displays that utilizes bounding mirror surfaces can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed:

1. A touchscreen display comprising:
   a transmitter system that dynamically scans at least one light beam above a surface such that substantially every point in a region above the surface is dynamically scanned by a light beam from at least two directions, where the region that is inclusive of substantially every point above the surface that is scanned by a light beam from at least two directions defines a surface of interest within which the presence of a contacting member that intercepts the light beam can be detected, and where the angular position of the at least one light beam is a function of at least one angular position signal;
   a receiver system comprising a first light distributing sensor and a second light distributing sensor that each bound the surface of interest along at least one edge, and are each external to the surface of interest, the light distributing sensors each including a corresponding photosensor, where light incident on a respective light distributing sensor is redirected away from the surface of interest and is guided within the respective light distributing sensor to its corresponding photosensor, which detects the presence of light incident on the respective light distributing sensor; and
   a processor;
   wherein the receiver system is configured to signal the detection of light by each of the photosensors corresponding to the first light distributing sensor and the second light distributing sensors, to the processor;
   wherein the processor is configured to determine the presence of a contacting member by evaluating whether the signal provided by the receiver system that communicates the detection of light indicates a disturbance in the regular detection of light;
   wherein the processor is configured to determine the angular position of the at least one light beam at a point in time when a contacting member is present using the at least one angular position signal; and
   wherein the processor is configured to triangulate the location of a contact point using at least the determined angular position of the at least one light beam at the point in time at which the contacting member was present.

2. The touchscreen display of claim 1, wherein the transmitter system comprises a single dynamic transmitter.

3. The touchscreen display of claim 2, wherein the single dynamic transmitter comprises a MEMS micromirror used in conjunction with at least two sources of light.

4. The touchscreen display of claim 3, wherein at least one of the at least two sources of light is an infrared semiconductor laser.

5. The touchscreen display of claim 2, wherein the transmitter system is configured to signal the angular position of the single dynamic transmitter to the processor.

6. The touchscreen display of claim 1, wherein the transmitter system comprises at least two dynamic transmitters, and wherein the angular position of a first of the at least two dynamic transmitters is a function of a first angular position signal and the angular position of a second of the at least two dynamic transmitters is a function of a second angular position signal.

7. The touchscreen display of claim 6, wherein at least one of the dynamic transmitters is in the form of a MEMS micromirror used in conjunction with at least one source of light.

8. The touchscreen display of claim 7, wherein the at least one source of light is an infrared semiconductor laser.

9. The touchscreen display of claim 1, wherein the transmitter system comprises a MEMS micromirror that is configured to reflect at least one scanned light beam across the surface of interest.

10. The touchscreen display of claim 9, wherein the MEMS micromirror is configured to rotate through an angle in an oscillatory fashion.

11. The touchscreen display of claim 10, wherein an applied voltage controls the rotation of the MEMS micromirror through an angle in an oscillatory fashion, the applied voltage being correlated with the angular position of the MEMS micromirror.

12. The touchscreen display of claim 1, wherein the transmitter system scans at least one light beam in a direction not parallel to the surface of interest.

13. The touchscreen display of claim 1, wherein the at least one light beam is scanned through a transmissive body.

14. The touchscreen display of claim 1, wherein the at least one light beam is scanned so as to approximate the emission of a Cartesian-type grid of light beams using a system of folding mirrors and optical strips.

15. The touchscreen display of claim 14, wherein the approximation of the emission of a Cartesian-type grid of light beams is achieved using a single MEMS micromirror in conjunction with a single source of light, and a system of folding mirrors and optical strips.

16. A method of triangulating a contact point incident on a surface of interest comprising:
    dynamically scanning at least one light beam above a surface such that substantially every point in a region above the surface is dynamically scanned by a light beam from at least two directions, where the region that is inclusive of substantially every point above the surface that is scanned by a light beam from at least two directions defines a surface of interest within which the presence of a contacting member that intercepts the light beam can be detected; generating at least one angular position signal such that the angular position of the at least one light beam that is scanned is a function of the at least one angular position signal;
    detecting the at least one light beam using a receiver system comprising a first light distributing sensor and a second light distributing sensor that each bound the surface of interest along at least one edge, and are each external to the surface of interest, the light distributing sensors each including a photosensor, where light incident on a respective light distributing sensor is redirected away from the surface of interest and is guided within the respective light distributing sensor to its corresponding photosensor, which detects the presence of light incident on the respective light distributing sensor;

signaling the detection of the at least one light beam;

determining the presence of a contacting member by evaluating whether the signaling of the detection of the at least one light beam indicates a disturbance in the regular detection of light;

determining the angular position of the at least one light beam at a point in time when a contacting member is present using the at least one angular position signal; and triangulating the location of the contact point using at least the determined angular position of the at least one light beam at the point in time at which the contacting member was present, using a processor.

17. The method of claim 16, wherein:

at least two light beams are dynamically scanned above the surface of interest; and the light beams are scanned such that none of the light beams are ever simultaneously incident on any single light distributing sensor.

18. The method of claim 17, wherein:

at least one dynamic transmitter is used to dynamically scan at least one light beam above the surface of interest such that substantially every point in a region above the surface of interest is dynamically scanned by a light beam from at least two directions; and the at least one dynamic transmitter is intermittently powered off such that none of the light beams are ever simultaneously incident on any single receiving element.

19. The method of claim 16, further comprising:

synchronizing the dynamic scanning of the at least one beam and the detection of the at least one beam to a reference clock signal;

wherein the processor determines the contact point based upon the timing of interruptions of the detection of the at least one dynamically scanned light beam.

20. A touchscreen display comprising:

a surface;

a processor;

two dynamic transmitters, each of which comprises a MEMS micromirror and an infrared semiconductor laser;

wherein each dynamic transmitter is configured such that its respective MEMS micromirror is able to redirect light from the respective infrared semiconductor laser across the surface, while the MEMS micromirror is rotating in an oscillatory fashion with an angular position that is a function of an angular position signal, thereby dynamically scanning a light beam across the surface, such that substantially every point in a region above the surface is dynamically scanned by a light beam from at least two directions, where the region that is inclusive of substantially every point above the surface that is scanned by a light beam from at least two directions defines a surface of interest within which the presence of a contacting member that intercepts the light beams can be detected;

a first light distributing sensor that bounds the surface of interest along at least one edge, and is external to the surface of interest, the first light distributing sensor including a first photosensor, where light incident on the first light distributing sensor is redirected away from the surface of interest and is guided within the first light distributing sensor to the first photosensor, which detects the presence of light incident on the first light distributing sensor;

a second light distributing sensor that bounds the surface of interest along at least one edge, and is external to the surface of interest, the second light distributing sensor including a second photosensor, where light incident on the second light distributing sensor is redirected away from the surface of interest and is guided within the second light distributing sensor to the second photosensor, which detects the presence of light incident on the second light distributing sensor;

wherein each of the first photosensor and the second photosensor signals the detection of light incident on their respective light distributing sensor to the processor;

wherein the processor is configured to determine the presence of a contacting member by evaluating whether the signals provided by the first photosensor and the second photosensor indicate a disturbance in the regular detection of light;

wherein the processor is configured to determine the angular position of each of the two dynamic transmitters when a contacting member is present using the respective angular position signals of the respective MEMS micromirrors within the respective dynamic transmitters; and wherein the processor is configured to triangulate the location of the contact point using at least the determined angular position of each of the two dynamic transmitters at the point in time at which the contacting member was present.

* * * * *

UNITED STATES PATENT AND TRADEMARK OFFICE
CERTIFICATE OF CORRECTION

PATENT NO. : 8,669,966 B2  
APPLICATION NO. : 13/406400  
DATED : March 11, 2014  
INVENTOR(S) : Payne Page 1 of 1

It is certified that error appears in the above-identified patent and that said Letters Patent is hereby corrected as shown below:

In the claims

Claim 1, line 54, delete "second light distributing sensors" insert --second light distributing sensor--.

Claim 16, line 60, insert a new line after "be detected;".

Signed and Sealed this
Twenty-sixth Day of April, 2016

Michelle K. Lee
*Director of the United States Patent and Trademark Office*